(12) United States Patent
Kim et al.

(10) Patent No.: US 11,737,115 B2
(45) Date of Patent: *Aug. 22, 2023

(54) METHOD AND APPARATUS FOR RECEIVING SYSTEM INFORMATION IN THE WIRELESS COMMUNICATION

(71) Applicant: LG Electronics Inc., Seoul (KR)

(72) Inventors: Youngsub Kim, Seoul (KR); Hyunsoo Ko, Seoul (KR); Sukhyon Yoon, Seoul (KR); Kijun Kim, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/520,367

(22) Filed: Nov. 5, 2021

(65) Prior Publication Data

US 2022/0061007 A1   Feb. 24, 2022

Related U.S. Application Data

(63) Continuation of application No. 16/737,473, filed on Jan. 8, 2020, now Pat. No. 11,246,110, which is a
(Continued)

(51) Int. Cl.
*H04L 12/28* (2006.01)
*H04W 72/23* (2023.01)
(Continued)

(52) U.S. Cl.
CPC ........... *H04W 72/23* (2023.01); *H04L 5/0048* (2013.01); *H04L 5/0053* (2013.01);
(Continued)

(58) Field of Classification Search
CPC .......... H04L 12/28; H04L 12/50; H04W 4/60; H04W 4/50; H04W 4/30
(Continued)

(56) References Cited

U.S. PATENT DOCUMENTS 10,887,969 B2 *  1/2021  Mollet .................. A01K 29/00
10,897,743 B2 *  1/2021  Kim .................. H04W 72/0446
(Continued)

FOREIGN PATENT DOCUMENTS

CN        104113906        10/2014
CN        105375964         3/2016
(Continued)

OTHER PUBLICATIONS

NTT Docomo, "WF on NR-PBCH contents and payload size," R1-1709754, Presented at 3GPP TSG RAN WG 1 Meeting #89, Hangzhou, China, May 15-19, 2017, 7 pages.
(Continued)

*Primary Examiner* — Dang T Ton
(74) *Attorney, Agent, or Firm* — Fish & Richardson P.C.

(57) ABSTRACT

The present invention discloses a method for a user equipment to receive system information in a wireless communication system. Particularly, the method is characterized in detecting a first synchronization signal block configured with a Primary Synchronization Signal (PSS), a Secondary Synchronization Signal (SSS) and a Physical Broadcasting Channel (PBCH) at a specific frequency position, determining a presence or non-presence of system information corresponding to the first synchronization signal block within a first synchronization raster corresponding to a specific frequency position based on a system information indicator included in the PBCH, and if the system information corresponding to the first synchronization signal block is determined as not existing, determining a second synchronization raster having system information exist therein based on the system information indicator.

11 Claims, 10 Drawing Sheets

Related U.S. Application Data continuation of application No. 16/295,504, filed on Mar. 7, 2019, now Pat. No. 10,897,743, which is a continuation of application No. 16/064,859, filed as application No. PCT/KR2018/006279 on Jun. 1, 2018, now Pat. No. 10,887,909.

(60) Provisional application No. 62/637,320, filed on Mar. 1, 2018, provisional application No. 62/635,573, filed on Feb. 27, 2018, provisional application No. 62/630,203, filed on Feb. 13, 2018, provisional application No. 62/514,922, filed on Jun. 4, 2017.

(51) Int. Cl.
| | |
|---|---|
| *H04L 5/00* | (2006.01) |
| *H04L 27/26* | (2006.01) |
| *H04W 56/00* | (2009.01) |
| *H04W 72/0446* | (2023.01) |

(52) U.S. Cl.
CPC ...... *H04L 27/2607* (2013.01); *H04L 27/2666* (2013.01); *H04W 56/001* (2013.01); *H04W 72/0446* (2013.01); *H04L 5/0007* (2013.01); *H04W 56/00* (2013.01)

(58) Field of Classification Search
USPC .................................. 370/329, 400, 395, 403
See application file for complete search history.

(56) References Cited

U.S. PATENT DOCUMENTS

| | | | |
|---|---|---|---|
| 11,129,120 B2* | 9/2021 | Kim | H04L 27/2666 |
| 11,246,110 B2* | 2/2022 | Kim | H04L 27/2611 |
| 11,464,053 B2* | 10/2022 | Ko | H04W 72/0453 |
| 2016/0157218 A1 | 6/2016 | Nam et al. | |
| 2018/0103445 A1 | 4/2018 | Akkarakaran et al. | |
| 2018/0167946 A1 | 6/2018 | Si et al. | |
| 2018/0198648 A1 | 7/2018 | Sun et al. | |
| 2018/0337755 A1 | 11/2018 | Wilson et al. | |
| 2019/0045529 A1 | 2/2019 | Xiong et al. | |
| 2019/0364551 A1 | 11/2019 | Zhang et al. | |
| 2019/0387485 A1 | 12/2019 | Ko et al. | |

FOREIGN PATENT DOCUMENTS

| | | |
|---|---|---|
| CN | 106063352 | 10/2016 |
| EP | 3739832 | 11/2020 |
| JP | 2017503419 | 1/2017 |
| JP | 2020-504971 | 2/2020 |
| KR | 1020100093169 | 8/2010 |
| KR | 101435532 | 9/2014 |
| KR | 1020170039694 | 4/2017 |
| WO | WO2017053024 | 3/2017 |
| WO | WO2018203672 | 11/2018 |
| WO | WO2019138075 | 7/2019 |

OTHER PUBLICATIONS

Office Action in European Appln. No. 18812724.5, dated Jun. 21, 2022, 9 pages.
Samsung, "Discussion on NR channel raster and sync raster," R4-1704772, Presented at 3GPP TSG-RAN WG4 Meeting #83, Hangzhou, China, May 15-19, 2017, 5 pages.
Extended European Search Report in European Appln. No. 21192361.0, dated Dec. 3, 2021, 13 pages.
Nokia & Nokia Shanghai Bell, "Remaining details on NR-PBCH," R1-1800803, Presented at 3GPP TSG-RAN WG1 NR AH #18-01, Vancouver, Canada Jan. 22-26, 2018, 8 pages.
"NR-PBCH design," R1-1705321, 3GPP TSG RAN WG1 #88bis, Spokane, USA Apr. 3-7, 2017, 8 pages.
3rd Generation Partnership Project; LG Electronics; "Remaining Details on PBCH design and contents," R1-1719893, 3GPP TSG RAN WG1, Reno, USA, Nov.-Dec. 2017, 9 pages.
CATT, "NR PBCH and NR physical channel carried system information," R1-1704538, 3GPP TSG RAN WG1 Meeting #88bis, Spokane, USA, Apr. 3-7, 2017, 4 pages.
CATT, "Remaining details on NR PBCH," R1-1800998, 3GPP TSG RAN WG1 Meeting AH 1801, Vancouver, Canada, dated Jan. 22-26, 2018, 10 pages, XP051385232.
Chinese Office Action in Chinese Application No. 201880027485.X, dated Jul. 3, 2020, 13 pages (with English translation).
Extended European Search Report in European Application No. 18812724.5, dated Mar. 5, 2020, 11 pages.
Huawei, HiSilicon, "Correction on RMSI configurations," R1-1800030, 3GPP TSG RAN WG1 Ad Hoc Meeting, Vancouver, Canada, dated Jan. 22-26, 2018, 14 pages, XP051384533.
Huawei, HiSilicon, "Discussion on SS block time index indication," R1-1708166, 3GPP TSG RAN WG1 Meeting #89, Hangzhou, China, May 15-19, 2017, 5 pages.
Intel Corporation, "Delivery of Remaining Minimum System Information," R1-1704712, 3GPP TSG RAN WG1 Meeting RAN1 #88bis, Spokane, WA, U.S.A,, Apr. 3-7, 2017, 3 pages.
Intel Corporation, "NR PBCH Design," R1-1704711, 3GPP TSG RAN WG1 Meeting RAN1 #88bis, Spokane, WA, USA, Apr. 3-7, 2017, 7 pages.
Intel Corporation, "Remaining system information delivery mechanisms," R1-1707340, 3GPP TSG RAN WG1 Meeting RAN1 #89, Hangzhou, P.R. China, May 15-19, 2017, 4 pages.
Japanese Office Action in Japanese Application No. 2019-534664, dated Jul. 7, 2020, 11 pages (with English translation).
LG Electronics, "Discussion on RACH Procedure," R1-1707594, 3GPP TSG RAN WG1 Meeting #89, Hangzhou, China, May 15-19, 2017, 11 pages.
LG Electronics, "Discussion on system information delivery," R1-1702439, 3GPP TSG RAN WG1 Meeting #88, Athens, Greece, Feb. 13-17, 2017, 4 pages.
InterDigital Communications, "On System Information Delivery in NR," R1-1705501, 3GPP TSG RAN WG1 Meeting #88bis, Spokane, USA, Apr. 3-7, 2017, 4 pages.
Nokia, "NR-PBCH Design," R1-1701060, 3GPP TSG-RAN WG1#NR, Spokane, U.S.A., Jan. 16-20, 2017, 12 pages.
Nokia, Alcatel-Lucent Shanghai Bell, "On Remaining System Information Delivery," R1-1705841, 3GPP TSG-RAN WG1 Meeting #88bis, Spokane, WA, USA, dated Apr. 3-7, 2017, 5 pages.
Notice of Allowance in Korean Application No. 10-2019-0022285, dated Jul. 5, 2019, 3 pages (with English translation).
Notice of Allowance in Korean Appln. No. 10-2019-0119674, dated Apr. 27, 2020, 4 pages (with English translation).
NTT Docomo, Inc., "Discussion on SS block composition and SS burst set composition," R1-1708437, 3GPP TSG RAN WG1 Meeting #89, Hangzhou, PR China, May 15-19, 2017, 5 pages.
NTT Docomo, Inc., "Further views on wider bandwidth operations for NR," R1-1708494, 3GPP TSG RAN WG1 Meeting #89, Hangzhou, P.R. China, May 15-19, 2017, 6 pages.
Qualcomm Incorporated, "PBCH design considerations," R1-1708571, 3GPP TSG-RAN WG1 #89, Hangzhou, P.R. China, May 15-19, 2017, 4 pages.
Qualcomm, "WF on RMSI presence flag," R1-1721684, 3GPP TSG RAN WG1 #91, Reno, U.S.A., dated Nov. 27-Dec. 1, 2017, 5 pages, XP051370764.
RAN WG1, "LS on NR-PBCH content," R1-1709789, 3GPP TSG RAN WG1 Meeting #89, Hangzhou, China, May 15-19, 2017, 2 pages.
Samsung, "SS frequency raster," R1-1700885, 3GPP TSG RAN WG1 NR Ad-Hoc Meeting, Spokane, USA, Jan. 16-20, 2017, 4 pages.
Samsung, "Remaining issues of NR-PBCH," R1-1709180, 3GPP TSG RAN WG1 #89, Hangzhou, P.R. China, dated May 15-19, 2017, 9 pages.
Samsung, "SS frequency raster for NR," R1-1705319, 3GPP TSG RAN WG1 Meeting #88bis, Spokane, USA, Apr. 3-7, 2017, 4 pages.
United States Final Office Action in U.S. Appl. No. 16/737,494, dated Nov. 5, 2020, 12 pages.

(56) References Cited

OTHER PUBLICATIONS

United States Office Action in U.S. Appl. No. 16/064,859, dated Mar. 24, 2020, 7 pages.
Nokia & Nokia Shanghai Bell, "On Remaining System Information Delivery," R1-1800804, Presented at 3GPP TSG-RAN WG1 NR AH #18-01, Vancouver, Canada Jan. 22-26, 2018, 12 pages.
Office Action in Japanese Appln. No. 2021-164724, dated Aug. 30, 2022, 7 pages (with English translation).
Decision to Grant in Japanese Appln. No. 2021164724, dated Feb. 21, 2023, 5 pages (with English translation).
Office Action in U.S. Appl. No. 17/987,475, dated Feb. 13, 2023, 24 pages.

* cited by examiner

FIG. 1
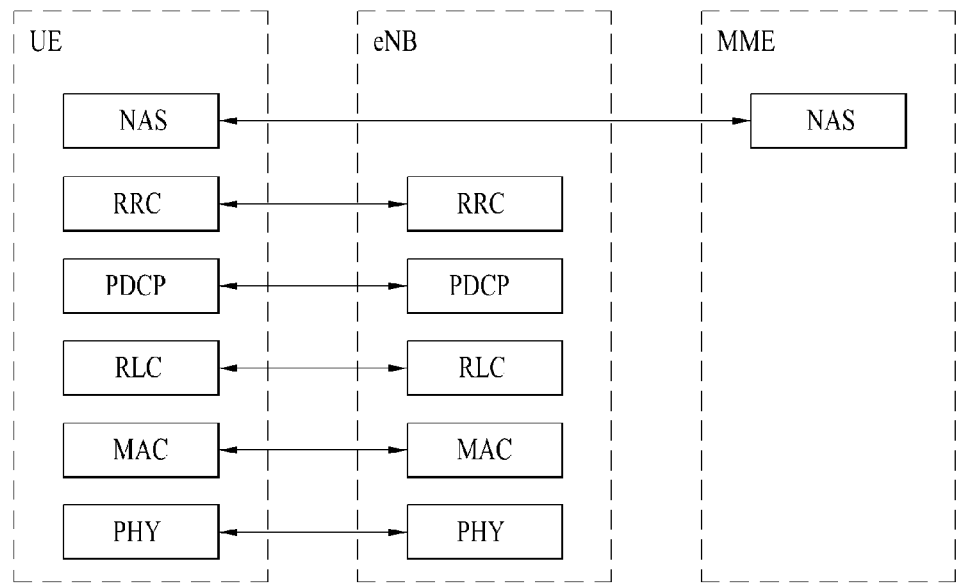
(A) CONTROL-PLANE PROTOCOL STACK
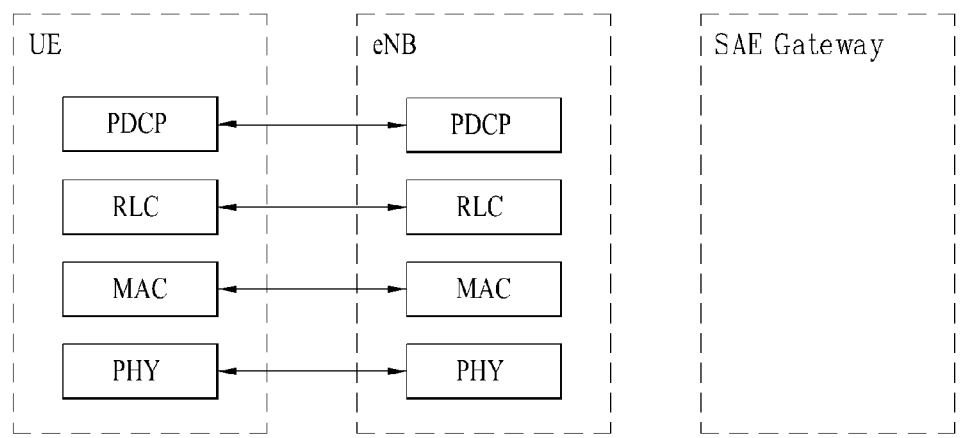
(B) USER-PLANE PROTOCOL STACK FIG. 7
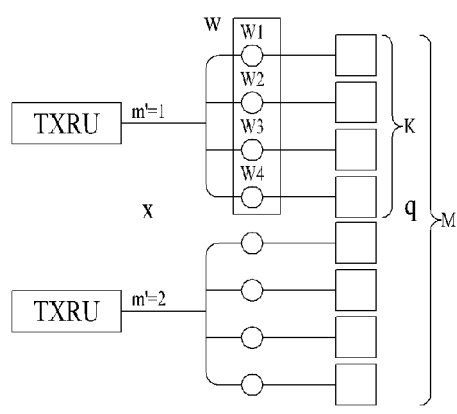
(A)
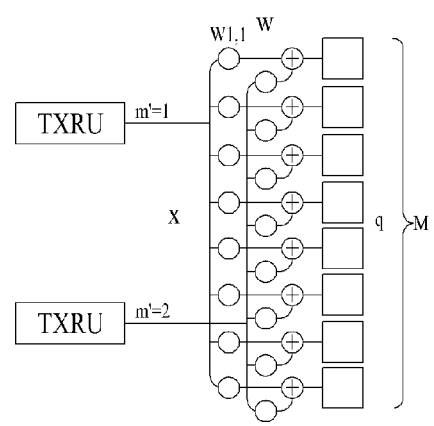
(B)

METHOD AND APPARATUS FOR RECEIVING SYSTEM INFORMATION IN THE WIRELESS COMMUNICATION

CROSS-REFERENCE TO RELATED APPLICATIONS

This application is a continuation of U.S. application Ser. No. 16/737,473, filed on Jan. 8, 2020, which is a continuation of U.S. application Ser. No. 16/295,504, filed on Mar. 7, 2019, now U.S. Pat. No. 10,897,743, which is a continuation of U.S. application Ser. No. 16/064,859, filed on Oct. 24, 2018, now U.S. Pat. No. 10,887,909, which is a National Stage application under 35 U.S.C. § 371 of International Application No. PCT/KR2018/006279, filed Jun. 1, 2018, which claims the benefit of U.S. Application No. 62/637,320, filed on Mar. 1, 2018, U.S. Application No. 62/635,573, filed Feb. 27, 2018, U.S. Application No. 62/630,203, filed Feb. 13, 2018, and U.S. Application No. 62/514,922, filed Jun. 4, 2017. The disclosures of the prior applications are incorporated by reference in their entirety.

TECHNICAL FIELD

The present invention relates to a method of receiving system information and apparatus therefor, and more particularly, to a method of system information does not exist in a synchronization raster from which a synchronization signal bloc is detected, obtaining information on a system information existing synchronization raster and then receiving the system information and apparatus therefor.

BACKGROUND

As more and more communication devices demand greater communication traffic as times go by, the next generation 5G system, which is wireless broadband communication, is being required over the existing LTE systems. In the next generation 5G system named NewRAT, communication scenarios are classified into Enhanced Mobile BroadBand (eMBB), Ultra-reliability and low-latency communication (URLLC), Massive Machine-Type Communications (mMTC), etc.

Here, eMBB is the next generation mobile communication scenario having such properties as High Spectrum Efficiency, High User Experienced Data Rate, High Peak Data Rate and the like, URLLC is the next generation mobile communication scenario having such properties as Ultra Reliable, Ultra Low Latency, Ultra High Availability and the like (e.g., V2X, Emergency Service, Remote Control), and mMTC is the next generation mobile communication scenario having such properties as Low Cost, Low Energy, Short Packet, Massive Connectivity and the like (e.g., IoT).

SUMMARY

One technical task of the present invention is to provide a method of receiving system information and apparatus therefor.

Technical tasks obtainable from the present invention are non-limited by the above-mentioned technical task. And, other unmentioned technical tasks can be clearly understood from the following description by those having ordinary skill in the technical field to which the present invention pertains.

In one technical aspect of the present invention, provided herein is a method of receiving system information by a user equipment in a wireless communication system, the method including detecting a first synchronization signal block configured with a Primary Synchronization Signal (PSS), a Secondary Synchronization Signal (SSS) and a Physical Broadcasting Channel (PBCH) at a specific frequency position, determining a presence or non-presence of system information corresponding to the first synchronization signal block within a first synchronization raster corresponding to a specific frequency position based on a system information indicator included in the PBCH, and if the system information corresponding to the first synchronization signal block is determined as not existing, determining a second synchronization raster having system information exist therein based on the system information indicator.

Here, the second synchronization raster may be determined based on the first synchronization raster and a relative position of a value corresponding to the system information indicator.

A position of the second synchronization raster may have a spacing amounting to an offset value corresponding to the system information indicator from a position of the first synchronization raster.

If the system information indicator indicates a specific value, the system information corresponding to the first synchronization signal block may be determined as not existing within a predetermined frequency range.

If the system information indicator indicates the specific value, a position of the second synchronization raster may not be determined.

And, the method may further include receiving a third synchronization signal block not having the system information at a frequency position not included in the first and second synchronization rasters.

In another technical aspect of the present invention, provided herein is a user equipment in receiving system information in a wireless communication system, the user equipment including an RF module transceiving a wireless signal with a base station and a processor configured to control the RF module, wherein the processor is further configured to detect a first synchronization signal block configured with a Primary Synchronization Signal (PSS), a Secondary Synchronization Signal (SSS) and a Physical Broadcasting Channel (PBCH) at a specific frequency position, determine a presence or non-presence of system information corresponding to the first synchronization signal block within a first synchronization raster corresponding to a specific frequency position based on a system information indicator included in the PBCH, and if the system information corresponding to the first synchronization signal block is determined as not existing, determine a second synchronization raster having system information exist therein based on the system information indicator.

Here, the second synchronization raster may be determined based on the first synchronization raster and a relative position of a value corresponding to the system information indicator.

A position of the second synchronization raster may have a spacing amounting to an offset value corresponding to the system information indicator from a position of the first synchronization raster.

If the system information indicator indicates a specific value, the system information corresponding to the first synchronization signal block may be determined as not existing within a predetermined frequency range.

If the system information indicator indicates the specific value, a position of the second synchronization raster may not be determined.

And, the user equipment may further include receiving a third synchronization signal block not having the system information at a frequency position not included in the first and second synchronization rasters.

According to the present invention, since a base station needs not to transmit system information on all bands on which a synchronization signal block is transmitted, an overhead can be reduced. Since a User Equipment (UE) can scan a system information existing band quickly, it is able to effectively obtain system information necessary for communication with a network.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

FIG. 1 is a diagram for structures of control and user planes of radio interface protocol between a 3GPP radio access network standard-based user equipment and E-UTRAN;

FIG. 7 illustrates examples of a connection scheme between TXRUs and antenna elements.

DETAILED DESCRIPTION

Figure 2:
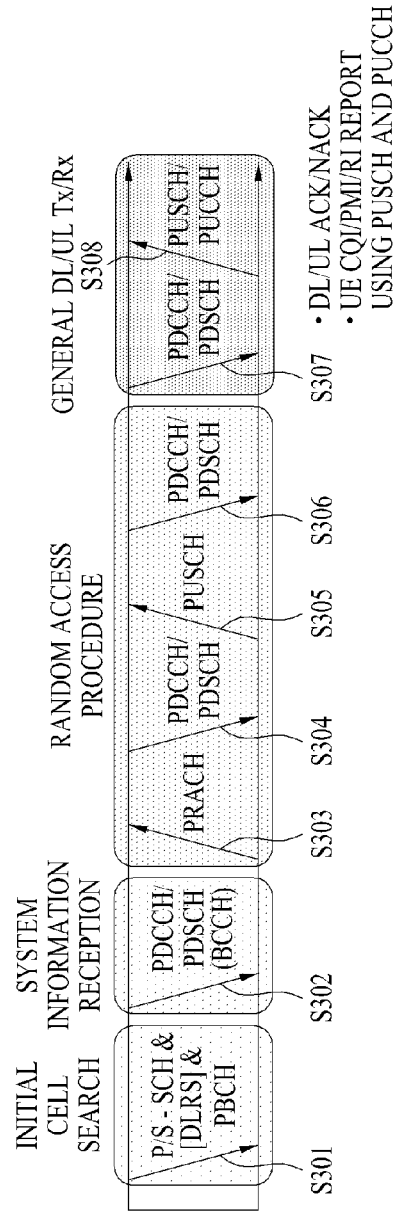
FIG. 2 is a diagram for explaining physical channels used for 3GPP system and a general signal transmission method using the physical channels.

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd Generation Partnership Project (3GPP) system.

While embodiments of the present disclosure are described in the context of Long Term Evolution (LTE) and LTE-Advanced (LTE-A) systems, they are purely exemplary. Therefore, the embodiments of the present disclosure are applicable to any other communication system as long as the above definitions are valid for the communication system.

The term 'Base Station (BS)' may be used to cover the meanings of terms including Remote Radio Head (RRH), evolved Node B (eNB or eNode B), Reception Point (RP), relay, etc.

FIG. 1 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a Physical Random Access Channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a Physical Uplink Shared Channel (PUSCH) and/or a Physical Uplink Control Channel (PUCCH) to the eNB (S208), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 3:
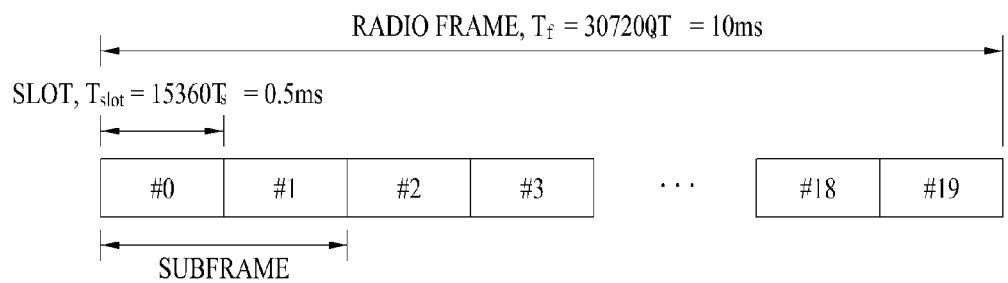
FIG. 3 is a diagram for a structure of a radio frame in LTE system.

FIG. 3 illustrates a structure of a radio frame used in the LTE system.

Referring to FIG. 3, a radio frame is 10 ms (327200×Ts) long and divided into 10 equal-sized subframes. Each subframe is 1 ms long and further divided into two slots. Each time slot is 0.5 ms (15360×Ts) long. Herein, Ts represents a sampling time and Ts=1/(15 kHz×2048)=3.2552×10-8 (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 4:
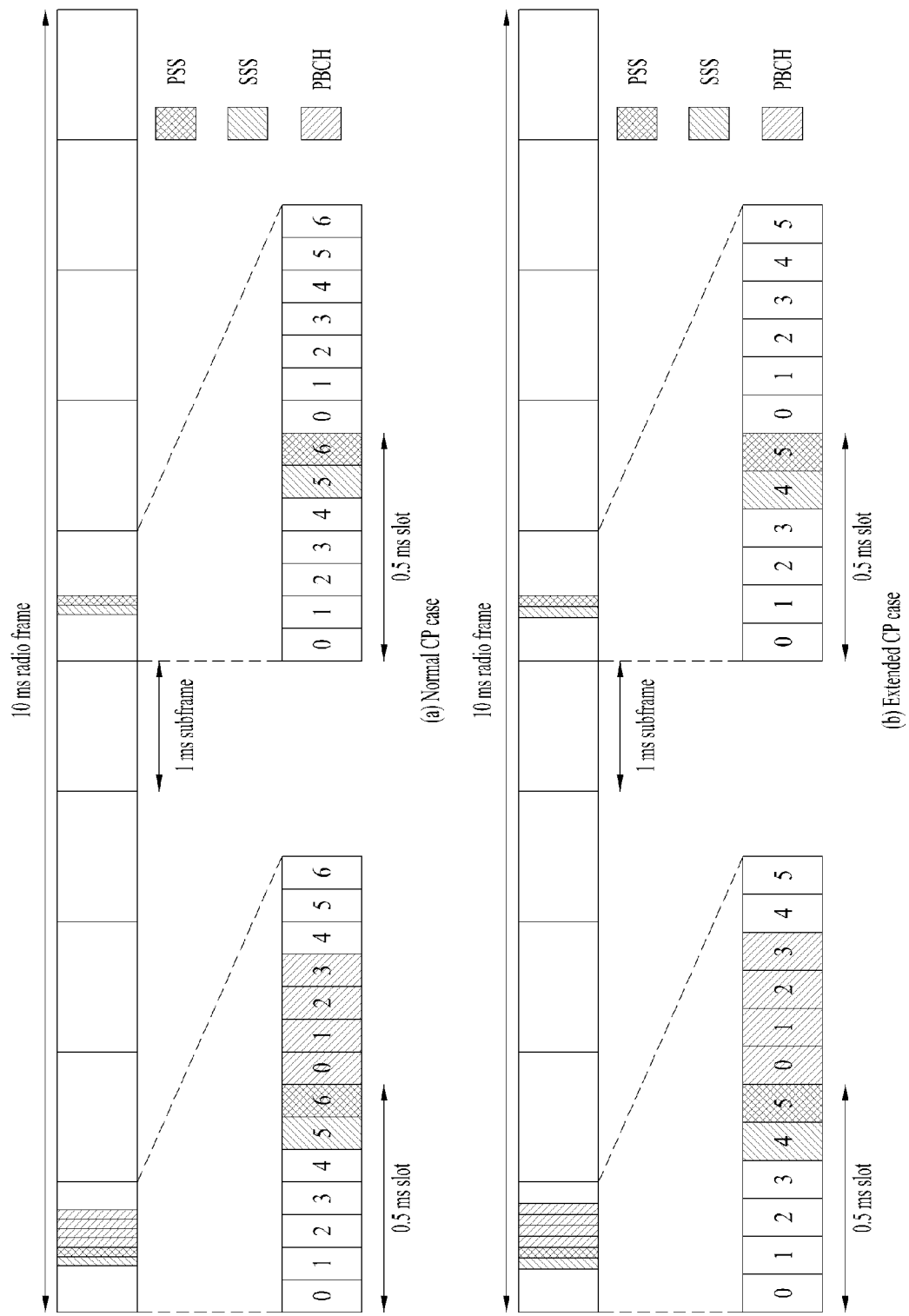
FIG. 4 is a diagram illustrating a radio frame structure for transmitting an SS (synchronization signal) in LTE system.

FIG. 4 is a diagram illustrating a radio frame structure for transmitting an SS (synchronization signal) in LTE system. In particular, FIG. 4 illustrates a radio frame structure for transmitting a synchronization signal and PBCH in FDD (frequency division duplex). FIG. 4 (a) shows positions at which the SS and the PBCH are transmitted in a radio frame configured by a normal CP (cyclic prefix) and FIG. 4 (b) shows positions at which the SS and the PBCH are transmitted in a radio frame configured by an extended CP.

An SS will be described in more detail with reference to FIG. 4. An SS is categorized into a PSS (primary synchronization signal) and an SSS (secondary synchronization signal). The PSS is used to acquire time-domain synchronization such as OFDM symbol synchronization, slot synchronization, etc. and/or frequency-domain synchronization. And, the SSS is used to acquire frame synchronization, a cell group ID, and/or a CP configuration of a cell (i.e. information indicating whether to a normal CP or an extended is used). Referring to FIG. 4, a PSS and an SSS are transmitted through two OFDM symbols in each radio frame. Particularly, the SS is transmitted in first slot in each of subframe 0 and subframe 5 in consideration of a GSM (Global System for Mobile communication) frame length of 4.6 ms for facilitation of inter-radio access technology (inter-RAT) measurement. Especially, the PSS is transmitted in a last OFDM symbol in each of the first slot of subframe 0 and the first slot of subframe 5. And, the SSS is transmitted in a second to last OFDM symbol in each of the first slot of subframe 0 and the first slot of subframe 5. Boundaries of a corresponding radio frame may be detected through the SSS. The PSS is transmitted in the last OFDM symbol of the corresponding slot and the SSS is transmitted in the OFDM symbol immediately before the OFDM symbol in which the PSS is transmitted. According to a transmission diversity scheme for the SS, only a single antenna port is used. However, the transmission diversity scheme for the SS standards is not separately defined in the current standard.

Referring to FIG. 4, by detecting the PSS, a UE may know that a corresponding subframe is one of subframe 0 and subframe 5 since the PSS is transmitted every 5 ms but the UE cannot know whether the subframe is subframe 0 or subframe 5. That is, frame synchronization cannot be obtained only from the PSS. The UE detects the boundaries of the radio frame in a manner of detecting an SSS which is transmitted twice in one radio frame with different sequences.

Having demodulated a DL signal by performing a cell search procedure using the PSS/SSS and determined time and frequency parameters necessary to perform UL signal transmission at an accurate time, a UE can communicate with an eNB only after obtaining system information necessary for a system configuration of the UE from the eNB.

The system information is configured with a master information block (MIB) and system information blocks (SIBs). Each SIB includes a set of functionally related parameters and is categorized into an MIB, SIB Type 1 (SIB1), SIB Type 2 (SIB2), and SIB3 to SIB8 according to the included parameters.

The MIB includes most frequently transmitted parameters which are essential for a UE to initially access a network served by an eNB. The UE may receive the MIB through a broadcast channel (e.g. a PBCH). The MIB includes a downlink system bandwidth (DL BW), a PHICH configuration, and a system frame number (SFN). Thus, the UE can explicitly know information on the DL BW, SFN, and PHICH configuration by receiving the PBCH. On the other hand, the UE may implicitly know information on the number of transmission antenna ports of the eNB. The information on the number of the transmission antennas of the eNB is implicitly signaled by masking (e.g. XOR operation) a sequence corresponding to the number of the transmission antennas to 16-bit CRC (cyclic redundancy check) used in detecting an error of the PBCH.

The SIB1 includes not only information on time-domain scheduling for other SIBs but also parameters necessary to determine whether a specific cell is suitable in cell selection. The UE receives the SIB1 via broadcast signaling or dedicated signaling.

A DL carrier frequency and a corresponding system bandwidth can be obtained by MIB carried by PBCH. A UL carrier frequency and a corresponding system bandwidth can be obtained through system information corresponding to a DL signal. Having received the MIB, if there is no valid system information stored in a corresponding cell, a UE applies a value of a DL BW included in the MIB to a UL bandwidth until system information block type 2 (SystemInformationBlockType2, SIB2) is received. For example, if the UE obtains the SIB2, the UE is able to identify the entire UL system bandwidth capable of being used for UL transmission through UL-carrier frequency and UL-bandwidth information included in the SIB2.

In the frequency domain, PSS/SSS and PBCH are transmitted irrespective of an actual system bandwidth in total 6 RBs, i.e., 3 RBs in the left side and 3 RBs in the right side with reference to a DC subcarrier within a corresponding OFDM symbol. In other words, the PSS/SSS and the PBCH are transmitted only in 72 subcarriers. Therefore, a UE is configured to detect or decode the SS and the PBCH irrespective of a downlink transmission bandwidth configured for the UE.

Having completed the initial cell search, the UE can perform a random access procedure to complete the accessing the eNB. To this end, the UE transmits a preamble via PRACH (physical random access channel) and can receive a response message via PDCCH and PDSCH in response to the preamble. In case of contention based random access, it may transmit additional PRACH and perform a contention resolution procedure such as PDCCH and PDSCH corresponding to the PDCCH.

Having performed the abovementioned procedure, the UE can perform PDCCH/PDSCH reception and PUSCH/PUCCH transmission as a general UL/DL signal transmission procedure.

The random access procedure is also referred to as a random access channel (RACH) procedure. The random access procedure is used for various usages including initial access, UL synchronization adjustment, resource allocation, handover, and the like. The random access procedure is categorized into a contention-based procedure and a dedicated (i.e., non-contention-based) procedure. In general, the contention-based random access procedure is used for performing initial access. On the other hand, the dedicated random access procedure is restrictively used for performing handover, and the like. When the contention-based random access procedure is performed, a UE randomly selects a RACH preamble sequence. Hence, a plurality of UEs can transmit the same RACH preamble sequence at the same time. As a result, a contention resolution procedure is required thereafter. On the contrary, when the dedicated random access procedure is performed, the UE uses an RACH preamble sequence dedicatedly allocated to the UE by an eNB. Hence, the UE can perform the random access procedure without a collision with a different UE.

The contention-based random access procedure includes 4 steps described in the following. Messages transmitted via the 4 steps can be respectively referred to as message (Msg) 1 to 4 in the present invention.

Step 1: RACH preamble (via PRACH) (UE to eNB)
Step 2: Random access response (RAR) (via PDCCH and PDSCH (eNB to)
Step 3: Layer 2/Layer 3 message (via PUSCH) (UE to eNB)
Step 4: Contention resolution message (eNB to UE)

On the other hand, the dedicated random access procedure includes 3 steps described in the following. Messages transmitted via the 3 steps can be respectively referred to as message (Msg) 0 to 2 in the present invention. It may also perform uplink transmission (i.e., step 3) corresponding to PAR as a part of the ransom access procedure. The dedicated random access procedure can be triggered using PDCCH (hereinafter, PDCCH order) which is used for an eNB to indicate transmission of an RACH preamble.

Step 0: RACH preamble assignment via dedicated signaling (eNB to UE)
Step 1: RACH preamble (via PRACH) (UE to eNB)
Step 2: Random access response (RAR) (via PDCCH and PDSCH) (eNB to UE)

After the RACH preamble is transmitted, the UE attempts to receive a random access response (RAR) in a preconfigured time window. Specifically, the UE attempts to detect PDCCH (hereinafter, RA-RNTI PDCCH) (e.g., a CRC masked with RA-RNTI in PDCCH) having RA-RNTI (random access RNTI) in a time window. If the RA-RNTI PDCCH is detected, the UE checks whether or not there is a RAR for the UE in PDSCH corresponding to the RA-RNTI PDCCH. The RAR includes timing advance (TA) information indicating timing offset information for UL synchronization, UL resource allocation information (UL grant information), a temporary UE identifier (e.g., temporary cell-RNTI, TC-RNTI), and the like. The UE can perform UL transmission (e.g., message 3) according to the resource allocation information and the TA value included in the RAR. HARQ is applied to UL transmission corresponding to the RAR. In particular, the UE can receive reception response information (e.g., PHICH) corresponding to the message 3 after the message 3 is transmitted.

A random access preamble (i.e. RACH preamble) consists of a cyclic prefix of a length of TCP and a sequence part of a length of TSEQ. The TCP and the TSEQ depend on a frame structure and a random access configuration. A preamble format is controlled by higher layer. The RACH preamble is transmitted in a UL subframe. Transmission of the random access preamble is restricted to a specific time resource and a frequency resource. The resources are referred to as PRACH resources. In order to match an index 0 with a PRB and a subframe of a lower number in a radio frame, the PRACH resources are numbered in an ascending order of PRBs in subframe numbers in the radio frame and frequency domain. Random access resources are defined according to a PRACH configuration index (refer to 3GPP TS 36.211 standard document). The RACH configuration index is provided by a higher layer signal (transmitted by an eNB).

In LTE/LTE-A system, subcarrier spacing for a random access preamble (i.e., RACH preamble) is regulated by 1.25 kHz and 7.5 kHz for preamble formats 0 to 3 and a preamble format 4, respectively (refer to 3GPP TS 36.211).

Figure 5:
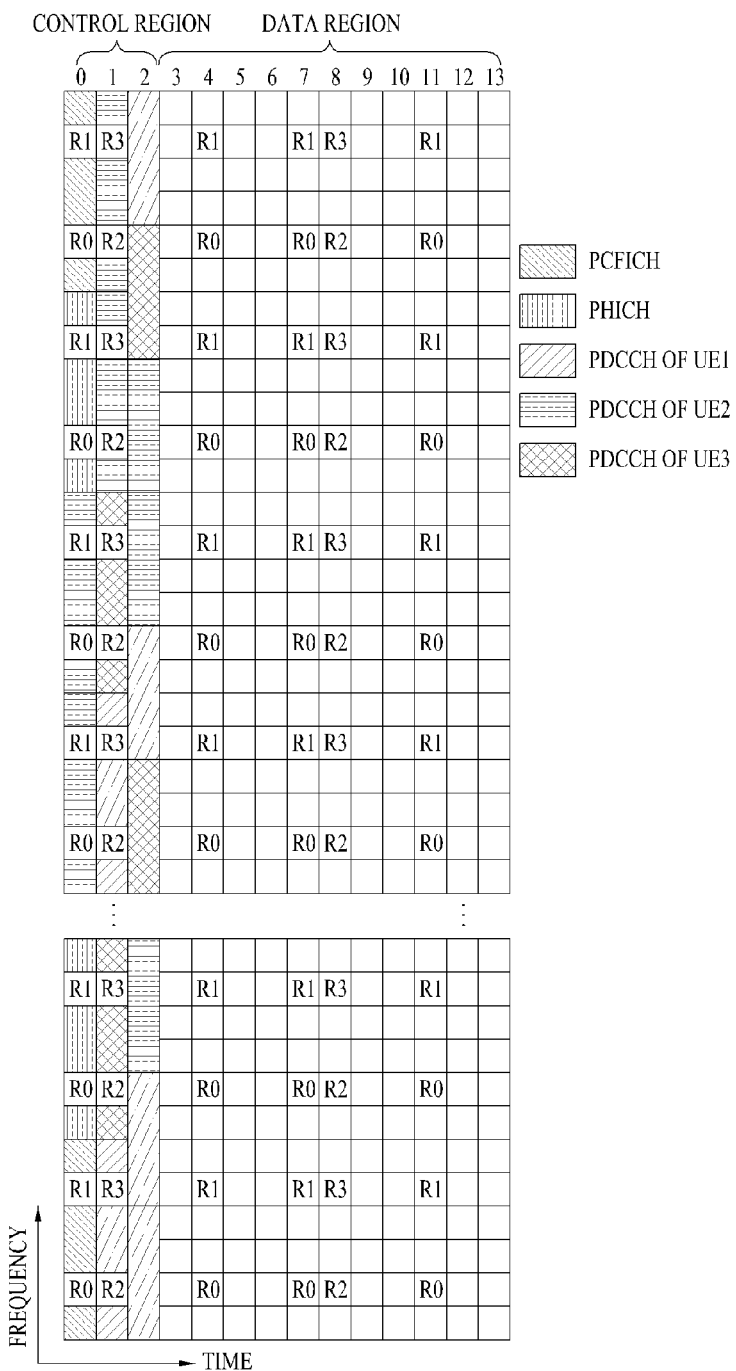
FIG. 5 illustrates a structure of a downlink radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
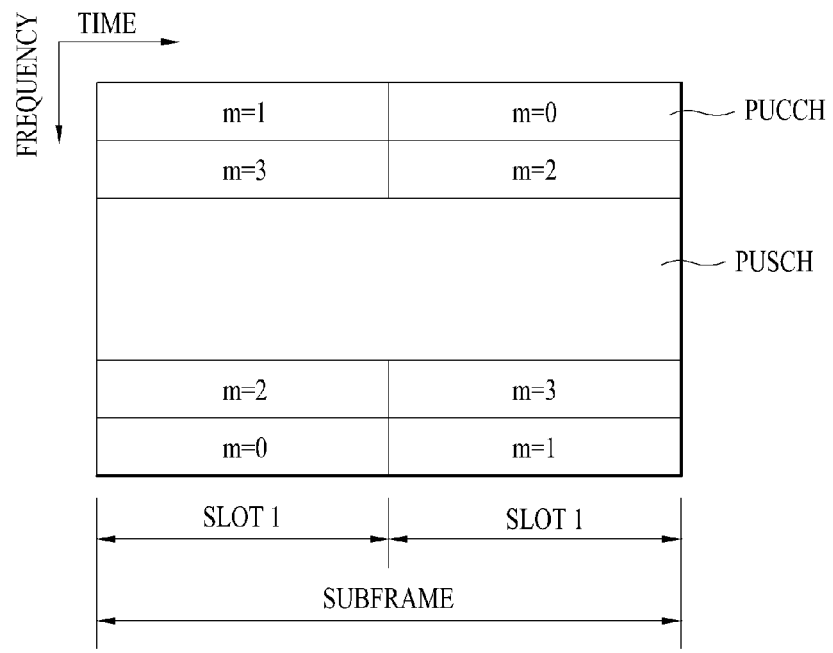
FIG. 6 illustrates a structure of an uplink subframe in the LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Hereinafter, channel state information (CSI) reporting will be described below. In the current LTE standard, there are two MIMO transmission schemes, open-loop MIMO operating without channel information and closed-loop MIMO operating with channel information. Particularly in the closed-loop MIMO, each of an eNB and a UE may perform beamforming based on CSI to obtain the multiplexing gain of MIMO antennas. To acquire CSI from the UE, the eNB may command the UE to feed back CSI on a downlink signal by allocating a PUCCH (Physical Uplink Control CHannel) or a PUSCH (Physical Uplink Shared CHannel) to the UE.

The CSI is largely classified into three information types, RI (Rank Indicator), PMI (Precoding Matrix), and CQI (Channel Quality Indication). First of all, the RI indicates rank information of a channel as described above, and means the number of streams that may be received by a UE through the same time-frequency resources. Also, since the RI is determined by long-term fading of a channel, the RI may be fed back to an eNB in a longer period than a PMI value and a CQI value.

Second, the PMI is a value obtained by reflecting spatial characteristics of a channel, and indicates a precoding matrix index of an eNB, which is preferred by the UE based on a metric such as signal to interference and noise ratio (SINR). Finally, the CQI is a value indicating channel strength, and generally means a reception SINR that may be obtained by the eNB when the PMI is used.

In the 3GPP LTE-A system, the eNB may configure a plurality of CSI processes for the UE, and may be reported CSI for each of the CSI processes. In this case, the CSI process includes CSI-RS resource for specifying signal quality and CSI-IM (interference measurement) resource, that is, IMR (interference measurement resource) for interference measurement.

Since a wavelength becomes short in the field of Millimeter Wave (mmW), a plurality of antenna elements may be installed in the same area. In more detail, a wavelength is 1 cm in a band of 30 GHz, and a total of 64 (8×8) antenna elements of a 2D array may be installed in a panel of 4 by 4 cm at an interval of 0.5 lambda(wavelength). Therefore, a recent trend in the field of mmW attempts to increase coverage or throughput by enhancing BF (beamforming) gain using a plurality of antenna elements.

In this case, if a transceiver unit (TXRU) is provided to control a transmission power and phase per antenna element, independent beamforming may be performed for each frequency resource. However, a problem occurs in that effectiveness is deteriorated in view of cost when TXRU is provided for all of 100 antenna elements. Therefore, a scheme is considered, in which a plurality of antenna elements are mapped into one TXRU and a beam direction is controlled by an analog phase shifter. Since this analog beamforming scheme may make only one beam direction in a full band, a problem occurs in that frequency selective beamforming is not available.

As an intermediate type of digital BF and analog BF, a hybrid BF having B TXRUs smaller than Q antenna elements may be considered. In this case, although there is a difference depending on a connection scheme of B TXRUs and Q antenna elements, the number of beam directions that enable simultaneous transmission is limited to B or less.

FIG. 7 illustrates examples of a connection scheme between TXRUs and antenna elements.

(a) of FIG. 7 illustrates that TXRU is connected to a sub-array. In this case, the antenna elements are connected to only one TXRU. Unlike (a) of FIG. 7, (b) of FIG. 7 illustrates that TXRU is connected to all antenna elements. In this case, the antenna elements are connected to all TXRUs. In FIG. 7, W indicates a phase vector multiplied by an analog phase shifter. That is, a direction of analog beamforming is determined by W. In this case, mapping between CSI-RS antenna ports and TXRUs may be 1-to-1 or 1-to-many.

As more communication devices require greater communication capacity, the need of mobile broadband communication more advanced than the conventional RAT (radio access technology) has been issued. Also, massive MTC (Machine Type Communications) technology that provides various services anywhere and at any time by connecting a plurality of devices and things is one of main issues which will be considered in next generation communication. Furthermore, a communication system design considering service/UE susceptible to reliability and latency has been discussed. Considering this status, the introduction of the next generation RAT has been discussed, and the next generation RAT will be referred to as NewRAT in the present invention.

Figure 8:
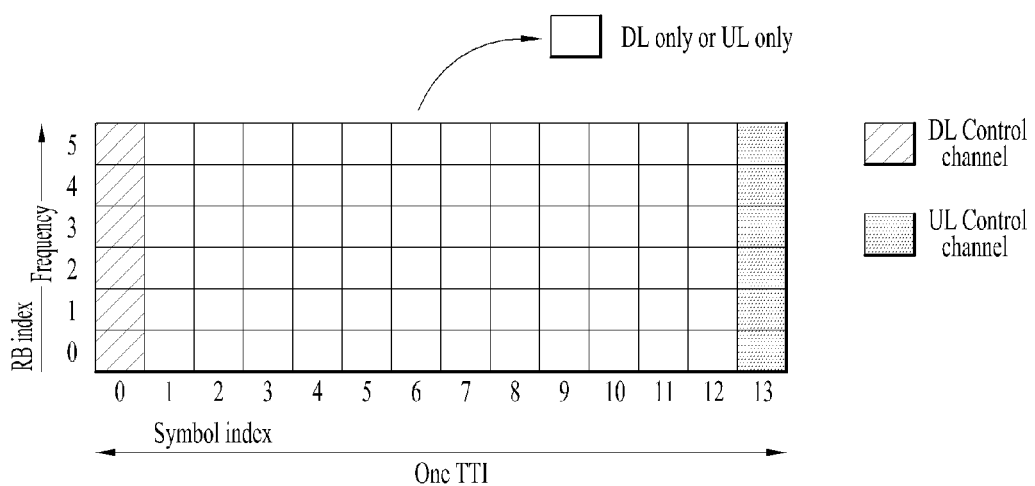
FIG. 8 illustrates an example of a self-contained subframe structure.

A self-contained subframe structure shown in FIG. 8 is considered in the fifth generation NewRAT to minimize data transmission latency in a TDD system. FIG. 8 illustrates an example of a self-contained subframe structure.

In FIG. 8, oblique line areas indicate downlink control regions and black colored areas indicate uplink control regions. Areas having no mark may be used for downlink data transmission or uplink data transmission. In this structure, downlink transmission and uplink transmission are performed in due order within one subframe, whereby downlink data may be transmitted and uplink ACK/NACK may be received within the subframe. As a result, the time required for data re-transmission may be reduced when an error occurs in data transmission, whereby latency of final data transfer may be minimized.

In this self-contained subframe structure, a time gap for switching from a transmission mode to a reception mode or vice versa is required for the eNB and the UE. To this end, some OFDM symbols (OS) at the time when a downlink is switched to an uplink in the self-contained subframe structure are set to a guard period.

Examples of the self-contained subframe type that may be configured in the system operating based on the NewRAT may consider four subframe types as follows.
  downlink control period+downlink data period+GP+uplink control period
  downlink control period+downlink data period
  downlink control period+GP+uplink data period+uplink control period
  downlink control period+GP+uplink data period In the present invention, a method of configuring a synchronization signal for a Bandwidth Part (BWP), in which Remaining Minimum System Information (RMSI) does not exist, on a network supportive of the 5G New RAT (NR) system is described as follows. In some implementations of the present invention, RMSI may be interpreted as a System Information Block 1 (SIB1) and include system information a UE should obtain after reception of a Master System Information Block (MIB) through NR-PBCH (Physical Broadcast Channel).

In order to increase total signal throughput, a system supportive of NR can define a wideband system of hundreds of MHz considerably wide in comparison with the legacy LTE system. In this case, a base station can configure an assigned wideband frequency with a single Component Carrier (CC) in order to use an assigned frequency as efficient as possible. Yet, on account of a cost price for manufacturing a UE, a usage of a UE and the like, a maximum frequency bandwidth supportable by a UE can be diversified. For this reason, the UE may not be able to cover the whole bandwidth assigned to the base station. Namely, a maximum frequency bandwidth supportable by the UE may be possibly smaller than the whole bandwidth assigned to the base station.

Therefore, in order to efficiently support a system, an NR system informs each UE of a frequency bandwidth and a frequency band position and the corresponding UE will operate based on a maximum frequency bandwidth supportable by a UE. And, the UE operates on the corresponding frequency band. In this case, a base station transmits a mobility Reference Signal (RS) defined for mobility support of the UE through a frequency band assigned to the UE, thereby supporting UE's mobility smoothly. For example, in case of NR, an SS block is basically defined as a mobility RS and a CSI-RS can be utilized as a mobility RS additionally if necessary.

Generally, a Synchronization Signal Block (SSB) is used for the usage of an initial access. Namely, a UE performing an access detects a cell using a PSS and a SSS in an SSB, and then obtains information for accessing a system by receiving System Information (SI) on the detected cell.

In case of an NR system, SI may be classified into Minimum System Information transmitted on NR-PBCH, Remaining System Information (RMSI) transmitted on PDSCH, and Other System Information (OSI). Here, the Minimum System Information transmitted on NR-PBCH may be interpreted as a Master System Information Block (MIB).

Generally, a UE detects an SSB and then determines that a cell is detected only if receiving Minimum System Information through NR-PBCH. Therefore, the NR system defines all PSS, SSS, and PBCH as SSB and stipulates that PSS, SSS and PBCH must be sent together for SSB transmission.

Meanwhile, as described above, in case of a base station supportive of broadband, an NR service should be supported on various bands for UEs supportive of a bandwidth narrower than a bandwidth supportable by the base station. Namely, a multitude of SSBs can be transmitted within a single system band supported by the base station.

In this case, if an initial access is allowed for all SSB transmitted bands, the base station should transmit RMSI and OSI on all the SSB transmitted bands. Yet, unless there are numerous UEs attempting the initial access, if the RMSI and OSI transmitted on all bands, it eventually works as an overhead of a system. Particularly, since a beam sweeping for a broadcast message on a ultrahigh frequency band such as a millimeter band should be performed in all beam directions, it causes a problem that system overhead increases in proportion to the number of beams supported by the base station.

On the other hand, if a base station transmits an SSB only but does not transmit RMSI or OSI in order to decrease system overhead, it causes a problem that a UE attempting an initial access detects the SSB and then attempts an initial access consistently to receive RMSI and OSI corresponding to the SSB.

Figure 9:
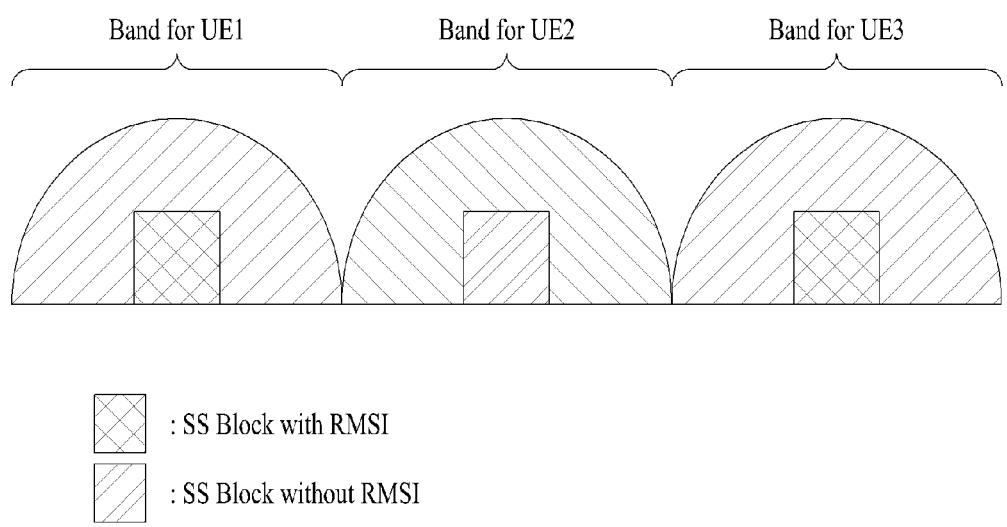
FIG. 9 is a diagram to describe a UE accessible band and a UE non-accessible band.

For example, referring to FIG. 9, in case of a UE1 and a UE3, since a base station transmits SSB and RMSI together within a band assigned for the UE1 and UE3, each of the UE1 and UE3 can succeed in an initial access in a manner of detecting the SSB and then receiving the RMSI. On the other hand, in case of a UE2, despite that the base station transmits an SSB only within a band assigned for the UE2 but does not transmit RMSI, the UE detects the SSB and then continues to attempt to receive RMSI through the SSB. Thus, it may cause a problem that the UE2 fails in an initial access.

To solve such a problem, the present invention intends to propose a method for a UE attempting an initial access (i.e., a UE attempting a frequency scan for determining a presence or non-presence of RMSI by changing a frequency band) to operate in a manner of distinguishing an accessible band corresponding to a frequency band allowing an initial access and a non-accessible band corresponding to a frequency band not allowing an initial access from each other.

Particularly, the present invention intends to propose the two solutions in the following as solutions for the above-described problem.

By preventing cell detection through an SSB, a UE cannot stay on a frequency band not supporting an initial access. Namely, a UE is made not to receive RMSI consistently on a non-accessible band.

Despite detecting an SSB, a UE is made to recognize that it is unable to attempt an initial access on an SSB detected frequency band. Namely, the UE is made to recognize that the SSB detected frequency band is a non-accessible band.

The above-proposed two solutions are described in detail as follows.

<1. A Method for Preventing a Success in Detection of SSB>

1-1. A Method of Defining a PSS Sequence or an SSS Sequence Differently According to a Band By defining a PSS sequence or an SSS sequence differently according to an accessible band or a non-accessible band, a UE attempting an initial access is made to fail in detection of an SSB. A detailed method of differently defining a PSS or SSS sequence according to a band is described as follows.

By defining PSS or SSS sequences of an accessible band and a non-accessible band differently, a UE is enabled to detect an SSB on the accessible band only.

A rule for mapping a PSS or SSS sequence to a Resource Element (RE) can be changed according to a band. For example, on a non-accessible band, a sequence is mapped to an RE in a reverse form or a sequence mapping method can be differentiated per band.

Moreover, the above-described method is applicable to one or both of a PSS and an SSS. Yet, if a non-accessible band assigned UE accessed a system already, the UE may be informed that the assigned band is a non-accessible band and instructed to detect an SSB using a PSS/SSS sequence different from that in attempting an initial access on an accessible band.

1-2. Method of Defining a Sequence Mapping Method Differently According to a Cell ID Generally, information on a cell ID is obtained through a PSS and an SSS. Particularly, in case of an NR system, a prescribed PSS ID is obtained from 3 PSS IDs through a PSS sequence and an SSS ID corresponding to a received SSS sequence is obtained using the PSS ID and timing information. And, a cell ID is obtained through the obtained PSS and SSS IDs.

In this case, a hypothesis for the SSS ID detection is determined from a PSS ID. Hence, by differentiating a hypothesis for an SSS ID mapped to a PSS ID according to an accessible band or a non-accessible band, a UE attempting an initial access can be prevented from cell detection through an SSB of the non-accessible band. For example, if an SSS ID of an accessible band has hypothetic values ranging from 0 to 336, an SSID of a non-accessible band can be configured to have values ranging from 337 to 673.

Yet, after a UE having a non-accessible band assigned thereto accessed a system already, the UE can be informed that the assigned band is a non-accessible band and instructed to detect an SSB using a cell ID mapping rule different from that in case of attempting an initial access on an accessible band.

1-3. Method of defining a position of an SSS differently with reference to a PSS LTE or NT system defines positions of PSS and SSS in a single slot. Namely, having obtained information on a reception (Rx) position of a PSS within an SSB though the PSS, a UE may assume a position at which an SSS will be received and attempt detection of the SSS at the assumed position.

Hence, by preventing a UE from receiving an SSS on a non-accessible band in a manner of differently assigning a position of an SSS with reference to a PSS in an SSB of a non-accessible band and a position of an SSS with reference to a PSS in an SSSB of an accessible band, it is able to make the UE fail in cell detection. For example, if a configuration of an SSB of an accessible band is in order of PSS-PBCH-SSS-PBCH, a configuration of an SSB of a non-accessible band can be set in order of SSS-PBCH-PSS-PBCH. Namely, by changing a position of an SSS with reference to a PSS, the UE is prevented from succeeding in cell detection on a non-accessible band.

Yet, after a UE having a non-accessible band assigned thereto accessed a system already, the UE can be informed that the assigned band is a non-accessible band and instructed to detect an SSB using symbol positions of PSS and SSS different from those in case of attempting an initial access on an accessible band.

1-4. Method of Changing a Frequency Position of an SSB

In case that a UE performs a frequency scan on a random band, a network may generally share a position of an SSB transmittable frequency with the UE in advance in order to help the UE obtain a presence or non-presence of a system through detection of the SSB. Here, the position of the SSB transmittable frequency can be named a sync raster and a sync raster defined between the network and the UE may be defined in the standard document. Namely, the sync raster can be agreed between the network and the UE in advance and defined in the standard document.

And, the UE performing the frequency scan performs a detection of an SSB at a sync raster shared in advance only. Hence, if an SSB is transmitted at a frequency that is not a sync raster shared between the network and the UE in advance, the UE attempting an initial access cannot succeed in SSB detection. Using this method, a wideband base station can transmit an SSB of a non-accessible band through a frequency that is not defined as an accessible sync raster for an accessible band.

Yet, after a UE having a non-accessible band assigned thereto accessed a system already, the UE should be informed of a transmission (Tx) position of the SSB on the non-accessible band. Namely, it can be indicated that the sync raster of the non-accessible band is spaced apart in a predetermined frequency offset from a position of the accessible sync raster of the accessible band. Here, the predetermined frequency offset may be shared between the network and the UE in advance or indicated by a base station. On the other hand, there may be a method for a base station to designate a sync raster, which is not an accessible sync raster of an accessible band, to a UE.

Using the above-described 4 kinds of methods, if the success in the detection of SSB is prevented, a base station should inform a UE of band information for a neighbor cell to measure a neighbor cell or inform the UE that a band currently assigned to the UE is common to all cells. For example, if a band currently assigned to a UE is an accessible band, it should be indicated that it is an accessible band in a neighbor cell as well, If a band assigned to a UE is a non-accessible band, it should be indicated that it is a non-accessible band in a neighbor cell as well.

<2. Method of Indicating that a Band Succeeding in SSB Detection is not a Carrier for an Initial Access>

Meanwhile, if an SSB is prevented from being detected, according to a UE's implementation algorithm and a configuration method of an SSB for a non-accessible band, a UE may attempt SSB detection for a long time, thereby causing a problem that a time for a frequency scan increases.

To solve the above-described problem, proposed in the following is a method of indicating that an SSB detected frequency band is a non-accessible band through information relevant to the SSB.

2.1. Method of Indicating a Non-Accessible Band Through an SSB Time Index

In an NR system, a multitude of SSBs can be transmitted at a single frequency for a multi-beam transmission. In doing so, an SSB time index for indicating where an SSB is located within a single frame can be transmitted through the SSB.

Hence, in order to inform a UE that an SSB detected band is a non-accessible band, an SSB time index for an accessible band and an SSB time index for a non-accessible band can be defined separately. Namely, when a UE performing an initial access detects an SSB, if an SSB time index obtained through the detected SSB is not a value corresponding to an accessible band, the UE recognizes that an SSB detected frequency is a non-accessible band, thereby stopping an access attempt to a system on the corresponding frequency.

For detailed example, if an SSB time index value of an accessible band is configured to have an odd number value (e.g., 1, 3, 5 . . . ) only, an SSB time index value of a non-accessible band can be configured to have an even number value (e.g., 2, 4, 6 . . . ). If a time index of an SSB detected by a UE is an odd number value, the UE may determine that an SSB detected frequency is an accessible band. If the time index of the SSB is an even number value, the UE may determine that an SSB detected frequency is a non-accessible band.

2-2. Method of Indicating a Non-Accessible Band Using PBCH DM-RS

In an NR system, PBCH is transmitted within an SSB and PBCH DM-RS is defined for channel estimation for PBCH reception. PBCH DM-RS is configured in a manner of defining a scrambling sequence including cell ID information at least for inter-cell classification and using the scrambling sequence.

Hence, in order to inform a UE that an SSB detected band is a non-accessible band, a scrambling sequence of PBCH DM-RS for an accessible band and a scrambling sequence of PBCH DM-RS for a non-accessible band can be defined differently. Namely, a UE performing an initial access can determine whether an SSB detected through a blind decoding for PBCH DM-RS is transmitted on an accessible band or a non-accessible band.

2-3. Method of Indicating a Non-Accessible Band Using PBCH Information

In case that a UE attempts an access to a system, the UE obtains information on a slot and frame boundary and cell ID information using a Synchronization Signal (SS) within an SSB. Thereafter, as a first process for obtaining System Information (SI), an operation of obtaining Minimum System Information (i.e., MIB) through PBCH is performed. In an NR system, a Super Frame Number (SFN), an SSB time index, scheduling information of RMSI and the like are obtained through Minimum System Information.

In this case, since System Information (SI) such as RMSI and the like is not transmitted on a non-accessible band basically, it is not necessary to transmit the scheduling information of the RMSI. Hence, using a bit field that delivers RMSI scheduling information unused on the non-accessible band, it is able to deliver information of an accessible sync raster. Namely, using a bit field delivering RMSI scheduling information, it is able to deliver information relevant to an SSB transmitted raster within an accessible band.

Having received the accessible sync raster information, a UE can directly move to the SSB transmitted raster of the accessible band. This is referred to as sync redirection. Through this, the UE can perform a frequency scan quickly.

In some implementations, information on an accessible sync raster may be indicated as a relative position from a current position in a sync raster currently scanned by a UE, or an absolute position of the accessible sync raster. For example, if information on an accessible sync raster is indicated as a relative position to a sync raster currently scanned by a UE, a specified frequency offset value is indicated with reference to the sync raster currently scanned by the UE, whereby a sync redirection to a sync raster indicated by the frequency offset value from the currently scanned sync raster is performed so as to enable a frequency scan to be performed at the corresponding sync raster.

Meanwhile, in order to perform the sync redirection, it is able to define a 1-bit field to distinguish whether a bit field for RMSI scheduling information actually includes the RMSI scheduling information or information for the sync redirection.

In some implementations, if the information for the RMSI scheduling indicates a specific bit or value, it is able to indicate that an SSB of an accessible band is not transmitted within a prescribed frequency range, i.e., a predetermined sync raster range. So to speak, if the information for the RMSI scheduling indicates a specific bit or value, it is able to indicate that an accessible band does not exist within a predetermined sync raster range.

To be more specific about the above description, when a UE performs an initial access, the UE can attempt an initial access through a non-accessible band on which an RMSI non-existing SSB is located and 'absence of RMSI in the corresponding band' can be delivered to the UE through PBCH MIB. After 'absence of RMSI' has been delivered to the UE, the UE should discover a position of an accessible band on which an RMSI existing SSB is transmitted. Although an SSB frequency position of an accessible band can be discovered by sequentially performing PBCH decoding according to SS_PBCH_frequency position that defines frequency positions of SSB in RAN4, if a non-accessible band is accessed contiguously, the UE may repeat a frequency scan process for a long time. Hence, for an efficient operation, the UE can be informed of frequency positions of an RMSI existing SSB. According to RAN4, frequency positions of an SSB can be defined as a function of a lowest frequency position of an NR operating band, a multiple of a sync raster, and a raster offset. For example, an LTE refarming band reusing an LTE band is defined as {N*900 kHz+M*5 kHz}, an FR1 band meaning a band below 6 GHz of NR is defined as {2400 MHz+N*1.44 MHz}, and an FR2 band meaning a band above 6 GHz of NR is defined as {[24250.08] MHz+N*[17.28] MHz}. In this case, specific values of M and N may follow Table 1 in the following.

Meanwhile, since RMSI corresponding to an SSB does not exist on a non-accessible band, 8 bits defined in PBCH MIB for RMSI CORESET configuration are not used. Hence, the 8 bits for the RMSI CORESET configuration can be used as an indicator indicating a frequency position of an SSB transmitted on an RMSI existing band, i.e., an accessible band. In NR, since the number and spacing of SSBs transmittable on a specific frequency band are defined differently per defined band, it is necessary to design that a frequency position of an SSB transmitted on an accessible band can be indicated in consideration of such definition.

So to speak, a frequency position of SSB defined per band can be defined as Table 1, and a frequency position of an RMSI existing SSB per band can be indicated according to 'embodiments 1 to 8' in the following.

(1) Embodiment 1

A reference frequency position of SSB is determined per band defined to be used in NR, and a frequency position of an RMSI existing SSB from the reference frequency position can be indicated as a relative value. In this case, if 8 bits are used, total 256 SSB frequency positions within a band can be indicated.

Meanwhile, if a frequency position of an RMSI existing SSB does not exist in 256 SSB frequency positions that can be indicated using 8 bits, it is necessary to indicate a frequency position of the RMSI existing SSB to a UE through additional signaling. Particularly, since a band n77 and a band n78 have 620 SSB transmittable frequency positions (possible SS_PBCH_frequency positions) and 342 SSB transmittable frequency positions, respectively, it is unable to indicate all SSB frequency positions using 256. Hence, in this case, using spare states among states that can be indicated using bits for PRB grid offset included in PBCH content, i.e., PBCH MIB, it is able to additionally define an indication of an RMSI existing frequency position.

For example, since 24 PRB grid offsets are indicated on a band FR1 using 5 bits, maximum 8 states can be additionally defined. Since 12 PRB grid offsets are indicated on a band FR2 using 4 bits, maximum 4 states can be additionally defined. Thereafter, a UE can be aware of a frequency position of an RMSI existing SSB from a specific reference point (e.g., 0, 256, or 512) according to an indicated state among the additionally defined states using 8 bits.

Moreover, when a frequency position of an RMSI existing SSB does not exist within a specific band, if such a fact is additionally signaled to a UE, the UE can attempt to discover the frequency position of the RMSI existing SSB

TABLE 1

| NR Operating Band | SS Block SCS | Mini channel BW | Number of SS entry/Lowest sync raster |
|---|---|---|---|
| n1 | 15 kHz | 5 MHz | 2109.9 MHz + 0.9*N + M*5 kHz, N = 0:63, M = −1, 0, or 1 |
| n2 | 15 kHz | 5 MHz | 1929.9 MHz + 0.9*N + M*5 kHz, N = 0:63, M = −1, 0, or 1 |
| n3 | 15 kHz | 5 MHz | 1804.8 MHz + 0.9*N + M*5 kHz, N = 0:80, M = −1, 0, or 1 |
| n5 | 15 kHz | 5 MHz | 868.8 MHz + 0.9*N + M*5 kHz, N = 0:25, M = −1, 0, or 1 |
|  | 15 kHz | 10 MHz | 868.8 MHz + 0.9*6*N + M*5 kHz, N = 0:3, M = −1, 0, or 1 |
|  | 30 kHz | 10 MHz | 873.3 MHz + 0.9*6*N + M*5 kHz, N = 0:1, M = −1, 0, or 1 |
| n7 | 15 kHz | 5 MHz | 2620.2 MHz + 0.9*N + M*5 kHz, N = 0:74, M = −1, 0, or 1 |
| n8 | 15 kHz | 5 MHz | 924.6 MHz + 0.9*N + M*5 kHz, N = 0:36, M = −1, 0, or 1 |
| n20 | 15 kHz | 5 MHz | 790.5 MHz + 0.9*N + M*5 kHz, N = 0:31, M = −1, 0, or 1 |
| n28 | 15 kHz | 5 MHz | 758.1 MHz + 0.9*N + M*5 kHz, N = 0:47, M = −1, 0, or 1 |
| n38 | 15 kHz | 5 MHz | 2569.8 MHz + 1.44*N, N = 0:35 |
| n41 | 15 kHz | 5 MHz | 2496 MHz + 1.44*N, N = 0:131 |
|  | 15 kHz | 10 MHz | 2496 MHz + 1.44*3*N, N = 0:43 |
|  | 30 kHz | 10 MHz | 2496 MHz + 1.44*N, N = 0:131 |
| n50 | 15 kHz | 5 MHz | 1432.2 MHz + 0.9*N + M*5 kHz, N = 0:91, M = −1, 0, or 1 |
| n51 | 15 kHz | 5 MHz | 1426.8 MHz + 0.9*N + M*5 kHz, N = 0:2, M = −1, 0, or 1 |
| n66 | 15 kHz | 5 MHz | 2109.9 MHz + 0.9*N + M*5 kHz, N = 0:97, M = −1, 0, or 1 |
|  | 15 kHz | 10 MHz | 2109.9 MHz + 0.9*6*N + M*5 kHz, N = 0:15, M = −1, 0, or 1 |
|  | 30 kHz | 10 MHz | 2195.1 MHz + 0.9*6*N + M*5 kHz, N = 0:14, M = −1, 0, or 1 |
| n70 | 15 kHz | 5 MHz | 1994.7 MHz + 0.9*N + M*5 kHz, N = 0:25, M = −1, 0, or 1 |
| n71 | 15 kHz | 5 MHz | 616.8 MHz + 0.9*N + M*5 kHz, N = 0:36, M = −1, 0, or 1 |
| n74 | 15 kHz | 5 MHz | 1474.5 MHz + 0.9*N + M*5 kHz, N = 0:45, M = −1, 0, or 1 |
| n75 | 15 kHz | 5 MHz | 1432.2 MHz + 0.9*N + M*5 kHz, N = 0:91, M = −1, 0, or 1 |
| n76 | 15 kHz | 5 MHz | 1426.8 MHz + 0.9*N + M*5 kHz, N = 0:2, M = −1, 0, or 1 |
| n77 | 30 kHz | 10 MHz | 3300 MHz + 1.44*N, N = 0:619 |
| n78 | 30 kHz | 10 MHz | 3300 MHz + 1.44*N, N = 0:341 |
| n79 | 30 kHz | 40 MHz | 4400 MHz + 1.44*21*N, N = 0:16 |
| n258 | 120 kHz | 50 MHz | 24250.08 MHz + N*17.28 MHz, N = 0:186 |
| n257 | 120 kHz | 50 MHz | 26513.76 MHz + N *17.28 MHz, N = 0:170 |
|  | 240 kHz | 100 MHz | 26548.32 MHz + 2* N *17.28 MHz, N = 0:83 |
| n260 | 120 kHz | 50 MHz | 37002.72 MHz + N *17.28 MHz, N = 0:171 |
|  | 240 kHz | 100 MHz | 34773.6 MHz + 2* N *17.28 MHz, N = 0:83 | by moving to another band. Through this process, it is able to reduce the UE's unnecessary repetition of a frequency scan. Meanwhile, the definitions of the additionally defined states are described as follows.

First state: RMSI does not exist within a corresponding band

Second state: RMSI does not exist at a corresponding sync raster. A relative value of a frequency position of an RMSI existing SSB from a reference frequency position defined by 8 bits ranges from 0 to 255.

Third state: RMSI does not exist at a corresponding sync raster. A relative value of a frequency position of an RMSI existing SSB from a reference frequency position defined by 8 bits ranges from 256 to 511.

Fourth state: RMSI does not exist at a corresponding sync raster. A relative value of a frequency position of an RMSI existing SSB from a reference frequency position defined by 8 bits ranges from 512 to 767.

(2) Embodiment 2

A reference frequency position of an SSB is determined per band defined to be used in NR and a frequency position of an RMSI existing SSB from the reference frequency position can be signaled as a relative value. In this case, if 8 bits are used, it is able to indicate total 256 SSB frequency positions within a band.

Meanwhile, for a UE's efficient operation, it is not necessary to indicate a case that a frequency position of an RMSI existing SSB does not exist within a band. The corresponding indication may use a state of one of 8 bits for signaling a frequency position of SSB. And, in this case, the number of states for signaling a frequency position of SSB becomes 255. Namely, the state of the 1 bit may include the followings.

First state: RMSI does not exist within a corresponding band

Yet, there may occur a case that it is unable to indicate frequency S_PBCH_frequency positions of all SSBs within a specific band using 8 bits.

For example, since a band n77 and a band n78 have 620 SSB transmittable frequency positions (possible SS_PBCH_frequency positions) and 342 SSB transmittable frequency positions, respectively, it is unable to indicate all SSB frequency positions using 255. Hence, additional signaling for indicating this is necessary. And, using spare states among states that can be indicated using bits for PRB grid offset included in PBCH content, i.e., PBCH MIB, it is able to additionally define an indication of an RMSI existing frequency position.

For example, since 24 PRB grid offsets are indicated on a band FR1 using 5 bits, maximum 8 states can be additionally defined. Since 12 PRB grid offsets are indicated on a band FR2 using 4 bits, maximum 4 states can be additionally defined. And, a UE can be aware of a frequency position of an RMSI existing SSB from a specific reference point according to an indicated state using 8 bits.

First state: RMSI does not exist at a corresponding sync raster. A relative value of a frequency position of an RMSI existing SSB from a reference frequency position defined by 8 bits ranges from 0 to 254.

Second state: RMSI does not exist at a corresponding sync raster. A relative value of a frequency position of an RMSI existing SSB from a reference frequency position defined by 8 bits ranges from 255 to 509.

Third state: RMSI does not exist at a corresponding sync raster. A relative value of a frequency position of an RMSI existing SSB from a reference frequency position defined by 8 bits ranges from 510 to 764.

A UE can be aware of a frequency position of an RMSI existing SSB using relative values of 255 SSB frequency positions represented as 8 bits from a reference point (0, 255 or 510) defined according to a state. Moreover, if a UE receives an indication of a state that a frequency position of an RMSI existing SSB does not exist within a specific band, the UE can attempt to discover the frequency position of the RMSI existing SSB by moving to another band. Through this process, it is able to reduce the UE's unnecessary repetition of a frequency scan.

(3) Embodiment 3

A position currently accessed by a UE is determined as a reference frequency position, and a frequency position of an RMSI existing SSB from the reference frequency position can be signaled as a relative value. If 8 bits are used, it is possible to indicate total 256 relative SSB frequency positions. In this case, an indication range can be configured in a low or high frequency position direction from a current frequency position (i.e., a reference frequency position) [e.g., N=−127~+128] or in a single direction [e.g., N=0~255]. If an indication range is configured in a single direction, all UEs have the same frequency scan direction in case of an initial access, which can be defined in the standard document.

Meanwhile, for an efficient operation of a UE, it is necessary to indicate a case that there is no single frequency position of an RMSI existing SSB within a range that can be currently indicated. In the present embodiment, such an indication may use one of 256 states using 8 bits to signal an SSB frequency position. In this case, the number of states for signaling a frequency position of SSB amounts to 255.

First state: RMSI does not exist within a corresponding indication range.

If a UE is aware that RMSI does not exist within a corresponding indication range, the UE can discover a frequency position of an RMSI existing SSB by starting a frequency scan again from a frequency position located at the very end among frequency positions that can be indicated by the indication range. If the indication range includes both directions, the UE moves to one of both ends. And, whether to move to which one of both ends can be signaled using an additional state. If the indication range includes a single direction, the UE can move to an end of the corresponding direction and perform a frequency scan. Hence, if the indication range includes both directions, the above-described state indicating 'RMSI does not exist within a corresponding indication range' can be changed as follows.

First state: RMSI does not exist within a corresponding indication range. Move to a lowest frequency position in the indication range.

Second state: RMSI does not exist within a corresponding indication range. Move to a highest frequency position in the indication range.

Moreover, if it is intended to inform a UE that a frequency position of an RMSI existing SSB is located within a frequency range greater than a frequency range corresponding to the indication range, additional signaling for indicating such information is required. And, it is able to inform the UE of a frequency position of an RMSI existing SSB located within a frequency range greater than a frequency range corresponding to the indication range using spare states among the states that can be indicated using bits for PRB grid offset included in a PBCH content, i.e., a PBCH MIB.

For example, since 24 PRB grid offsets are indicated using 5 bits on a band FR1, maximum 8 states can be additionally defined. Since 12 PRB grid offsets are indicated using 4 bits on a band FR2, maximum 4 states can be additionally defined. If an indication range is configured in a single direction, the additionally defined state(s) can be represented as follows. In the following, K indicates a value corresponding to a frequency range greater than a frequency range corresponding to the indication range.

First state: RMSI does not exist at a corresponding sync raster, and K is 0.
Second state: RMSI does not exist at a corresponding sync raster, and K is 255.
Third state: RMSI does not exist at a corresponding sync raster, and K is 510.

Namely, in case of using the above-described method, if a current location of a UE and a value for an indication range indicated with 8 bits are set to 0 and N (0~255), respectively, an indicated frequency position
can be expressed as
Indicated position=O+N+K.

Yet, if an indication range is configured in both directions, the additionally defined state(s) can be represented as follows.

First state: RMSI does not exist at a corresponding sync raster, and K is 0.
Second state: RMSI does not exist at a corresponding sync raster, and K is −127 or 127, where a sign of K is equal to that of N.
Third state: RMSI does not exist at a corresponding sync raster, and K is −254 or 254, where a sign of K is equal to that of N.

Namely, if a current location of a UE and a value indicated with 8 bits are set to O and N (−127~127), respectively, an indicated frequency position
can be expressed as
Indicated position=O+N+K.

(4) Embodiment 4

A position currently accessed by a UE is set as a reference frequency position, and it is able to signal a frequency position of an RMSI existing SSB from the reference frequency position as a relative value. If 8 bits are used, it is possible to indicate total 256 relative SSB frequency positions. In this case, an indication range can be configured in a low or high frequency position direction from a current frequency position (i.e., a reference frequency position) [e.g., N=−127~+128] or in a single direction [e.g., N=0~255]. If an indication range is configured in a single direction, all UEs have the same frequency scan direction in case of an initial access, which can be defined in the standard document.

Meanwhile, for an efficient operation of a UE, it is necessary to indicate a case that there is no single frequency position of an RMSI existing SSB within a range that can be currently indicated. Moreover, if it is intended to inform a UE that a frequency position of an RMSI existing SSB is located within a frequency range greater than a frequency range corresponding to the indication range, additional signaling for indicating such information is required. And, it is able to inform the UE of a frequency position of an RMSI existing SSB located within a frequency range greater than a frequency range corresponding to the indication range using spare states among the states that can be indicated using bits for PRB grid offset included in a PBCH content, i.e., a PBCH MIB.

For example, since 24 PRB grid offsets are indicated using 5 bits on a band FR1, maximum 8 states can be additionally defined. Since 12 PRB grid offsets are indicated using 4 bits on a band FR2, maximum 4 states can be additionally defined. If an indication range is configured in a single direction, the additionally defined state(s) can be represented as follows. In the following, K indicates a value corresponding to a frequency range greater than a frequency range corresponding to the indication range.

First state: RMSI does not exist at a corresponding sync raster.
Second state: RMSI does not exist at a corresponding sync raster, and K is 0.
Third state: RMSI does not exist at a corresponding sync raster, and K is 255.
Fourth state: RMSI does not exist at a corresponding sync raster, and K is 510.

Namely, in case of using the above-described method, if a current location of a UE and a value for an indication range indicated with 8 bits are set to 0 and N (0~255), respectively, an indicated frequency position
can be expressed as
Indicated position=O+N+K.

Here, if the first state is delivered to a UE, the UE may recognize that there is no RMSI existing frequency position within the indication range and detect SSB by moving to a frequency position indicated through an 8-bit indicator and then performing a frequency scan again. The UE checks a presence or non-presence of RMSI through PBCH included in the SSB. In case of the non-presence of the RMSI, the UE may repeat a process for obtaining information on an RMSI existing frequency position.

Besides, if an indication range is configured in both directions, the additionally defined state(s) can be represented as follows.

First state: RMSI does not exist in a corresponding indication range.
Second state: RMSI does not exist in a corresponding indication range, and K is 0
Third state: RMSI does not exist in a corresponding indication range, and K is −127 or 127, where a sign of K is equal to that of N.
Fourth state: RMSI does not exist in a corresponding indication range, and K is −254 or 254, where a sign of K is equal to that of N.

If a current location of a UE and a value indicated with 8 bits are set to O and N (−127~127), respectively, an indicated frequency position
can be expressed as
Indicated position=O+N+K.

Here, if the first state is delivered to a UE, the UE may recognize that there is no RMSI existing frequency position within the indication range and obtain information on an RMSI existing frequency position through additional signaling for the first to fourth states by moving to a frequency position indicated through an 8-bit indicator and then performing a frequency scan again.

(5) Embodiment 5

Sync rasters currently defined in RAN4 are defined as Table 2 in the following.

| NR Operating Band | SS Block SCS | SS Block pattern[1] | Range of GSCN (First – <Step size> – Last) |
|---|---|---|---|
| n1 | 15 kHz | Case A | 7039 – <1> – 7224 |
| n2 | 15 kHz | Case A | 6439 – <1> – 6624 |
| n3 | 15 kHz | Case A | 6022 – <1> – 6258 |
| n5 | 15 kHz | Case A | 2902 – <1> – 2973 |
|  | 30 kHz | Case B | 2911 – <1> – 2964 |
| n7 | 15 kHz | Case A | [8740 – <1> – 8958] |
| n8 | 15 kHz | Case A | 3091 – <1> – 3192 |
| n20 | 15 kHz | Case A | 2644 – <1> – 2727 |
| n28 | 15 kHz | Case A | 2533 – <1> – 2667 |
| n38 | 15 kHz | Case A | [8572 – <1> – 8958] |
| n41 | 15 kHz | Case A | [9069] – <TBD> – [9199] |
|  | 30 kHz | Case C | 9070 – <1> – 9198 |
| n50 | 15 kHz | Case A | 4780 – <1> – 5049 |
| n51 | 15 kHz | Case A | 4762 – <1> – 4764 |
| n66 | 15 kHz | Case A | 7039 – <1> – [7326] |
|  | 30 kHz | Case B | 7048 – <1> – [7317] |
| n70 | 15 kHz | Case A | 6655 – <1> – [6726] |
| n71 | 15 kHz | Case A | 2062 – <1> – 2166 |
| n74 | 15 kHz | Case A | 4924 – <1> – 5052 |
| n75 | 15 kHz | Case A | [4780 – <1> – 5049] |
| n76 | 15 kHz | Case A | [4762 – <1> – 4764] |
| n77 | 30 kHz | Case C | 9628 – <1> – 10247 |
| n78 | 30 kHz | Case C | 9628 – <1> – 9969 |
| n79 | 30 kHz | Case C | [10393] – <1> – [10802] |

NOTE 1:
SS Block pattern is defined in section 4.1 in [TS 38.213].

In Embodiment 5, it is able to indicate a frequency position of an RMSI existing SSB with reference to Global Synchronization Channel Number (GSCN) shown in Table 2. Here, assuming that an 8-bit indicator is used to indicate a frequency position of an RMSI existing SSB, the whole GSCN is divided into 256 (8-bit) units and the frequency position of the RMSI existing SSB can be indicated within the 256 ranges.

For example, assuming that 256 units are regarded as a single cluster, as a UE is aware of a GSCN number accessed by the UE, the UE can determine a remainder found by dividing the GSCN number by 256 as its own reference position within the cluster. And, the UE can discover a frequency position of an RMSI existing SSB by moving within the cluster by an indicated position from the determined reference position.

Meanwhile, for an efficient operation of a UE, it is necessary to indicate a case that there is no single frequency position of an RMSI existing SSB within a current cluster. To this end, it is able to inform the UE of a frequency position of an RMSI existing SSB located within a frequency range greater than a frequency range corresponding to the indication range using spare states among the states that can be indicated using bits for PRB grid offset included in a PBCH content, i.e., a PBCH MIB.

For example, since 24 PRB grid offsets are indicated using 5 bits on a band FR1, maximum 8 states can be additionally defined. Since 12 PRB grid offsets are indicated using 4 bits on a band FR2, maximum 4 states can be additionally defined. And, the additionally defined state(s) can be represented as follows.

First state: RMSI does not exist within a corresponding sync raster. Move to a frequency position indicated within a corresponding cluster.
Second state: RMSI does not exist within a corresponding sync raster. Move to a next cluster having a higher frequency.
Third state: RMSI does not exist within a corresponding sync raster. Move to a next cluster having a lower frequency.

As a UE receives an indication of a first state, if a frequency position of an RMSI existing SSB exists within a current cluster, the UE may discover an SSB by moving to an indicated position. In case of being aware that an RMSI existing frequency position does not exist in the current cluster like the second or third state, the UE performs a frequency scan again by moving to another cluster at a higher frequency or another cluster at a lower frequency. Such indication helps the UE to reduce performing an unnecessary frequency scan.

Moreover, when a specific frequency position is indicated within a cluster, if an RMSI existing SSB does not exist at the corresponding frequency position, the UE determines that there is no frequency position of the RMSI existing SSB that can be currently indicated and is then able to perform a frequency scan again by starting with the indicated frequency position. Such a method can prevent the UE from performing an unnecessary scan. In case of this method, since the second state and the third state are not used, the corresponding state can be used for the extension of the indication range.

(6) Embodiment 6

In Embodiment 6, it is able to indicate a frequency position of an RMSI existing SSB with reference to Global Synchronization Channel Number (GSCN) shown in Table 2. Here, assuming that an 8-bit indicator is used to indicate a frequency position of an RMSI existing SSB, the whole GSCN is divided into 256 (8-bit) units and the frequency position of the RMSI existing SSB can be indicated within the 256 ranges.

For example, assuming that 256 units are regarded as a single cluster, as a UE is aware of a GSCN number accessed by the UE, the UE can determine a remainder found by dividing the GSCN number by 256 as its own reference position within the cluster. And, the UE can discover a frequency position of an RMSI existing SSB by moving within the cluster by an indicated position from the determined reference position.

Yet, in case of using an 8-bit indicator, a frequency position of an SSB can be indicated within a single cluster range only. Therefore, if it is intended to inform a UE of a frequency position of an RMSI existing SSB within a frequency range greater than a single cluster, additional signaling for indicating such information is required. And, it is able to inform the UE of a frequency position of an RMSI existing SSB located within a frequency range greater than a frequency range corresponding to the cluster using spare states among the states that can be indicated using bits for PRB grid offset included in a PBCH content, i.e., a PBCH MIB.

For example, since 24 PRB grid offsets are indicated using 5 bits on a band FR1, maximum 8 states can be additionally defined. Since 12 PRB grid offsets are indicated using 4 bits on a band FR2, maximum 4 states can be additionally defined. And, the additionally defined state(s) can be represented as follows.

First state: RMSI does not exist within a corresponding sync raster. An indication range of 'N' is 0~255.
Second state: RMSI does not exist within a corresponding sync raster. An indication range of 'N' is 256~511.

Third state: RMSI does not exist within a corresponding sync raster. An indication range of 'N' is −256~255.

Fourth state: RMSI does not exist within a corresponding sync raster. An indication range of 'N' is −512~257.

If a frequency position of an RMSI existing SSB exists within an indicated indication range, a UE may discover an SSB by moving to an indicated position. Although a frequency position within an indication range is indicated, if the RMSI existing SSB does not exist at the indicated frequency position, the UE determines that the frequency position of the RMSI existing SSB does not exist within the current indication range and then discovers a frequency position of an RMSI existing SSB by performing a frequency scan again by starting with the indicated frequency position. Such a method can prevent the UE from performing an unnecessary frequency scan.

Moreover, the UE may perform a frequency scan by directly moving to a lowest or highest frequency in a manner of adding 'RMSI does not exist within a corresponding indication range' to a state. The corresponding state may be represented through a PRB grid offset or an additional 8-bit indicator. Here, if the state is represented through an 8-bit indicator, a size of a cluster becomes smaller than 256. For example, if the above state exists as one of two types, a size of a cluster may become 254.

First state: RMSI does not exist within a corresponding indication range. Move to a highest frequency position within the corresponding indication range.

Second state: RMSI does not exist within a corresponding sync raster. Move to a lowest frequency position within the corresponding indication range.

(7) Embodiment 7

In Embodiment 7, it is able to indicate a frequency position of an RMSI existing SSB with reference to Global Synchronization Channel Number (GSCN) shown in Table 2. Here, assuming that an 8-bit indicator is used to indicate a frequency position of an RMSI existing SSB, the whole GSCN is divided into 256 (8-bit) units and the frequency position of the RMSI existing SSB can be indicated within the 256 ranges.

For example, assuming that 256 units are regarded as a single cluster, as a UE is aware of a GSCN number accessed by the UE, the UE can determine a remainder found by dividing the GSCN number by 256 as its own reference position within the cluster. And, the UE can discover a frequency position of an RMSI existing SSB by moving within the cluster by an indicated position from the determined reference position.

Yet, in case of using an 8-bit indicator, a frequency position of an SSB can be indicated within a single cluster range only. Therefore, if it is intended to inform a UE of a frequency position of an RMSI existing SSB within a frequency range greater than a single cluster, additional signaling for indicating such information is required. And, it is able to inform the UE of a frequency position of an RMSI existing SSB located within a frequency range greater than a frequency range corresponding to the cluster using spare states among the states that can be indicated using bits for PRB grid offset included in a PBCH content, i.e., a PBCH MIB.

For example, since 24 PRB grid offsets are indicated using 5 bits on a band FR1, maximum 8 states can be additionally defined. Since 12 PRB grid offsets are indicated using 4 bits on a band FR2, maximum 4 states can be additionally defined.

TABLE 3

| NR Operating Band | Downlink (DL) operating band, BS transmit UE receive |
|---|---|
| n7 | 2620 MHz – 2690 MHz |
| n38 | 2570 MHz – 2620 MHz |
| n41 | 2496 MHz – 2690 MHz |

Moreover, as the bands n42, n7 and n38 in Table 3 share the same frequency band but have different sync raster sizes 1.44 MHz, 900 kHz and 900 kHz, respectively, they have different GSCN numbers on the same frequency band like Table 2. Hence, although a frequency position of an RMSI existing SSB is indicated, it is unclear that an indicated band indicates which band exactly in aspect of UE. This is because a band assumed by the UE as located thereon may be different from an actually SSB detected band. Hence, to remove such ambiguity, it is necessary to signal whether a size of a sync raster is 900 kHz or 1.44 MHz.

Meanwhile, since the problem about the ambiguity may be caused on a band FR1, it is able to utilize 8 spare states that can be additionally defined on the band FR1.

Namely, in order to indicate a frequency position of an RMSI existing SSB, maximum 8 states additionally defined on FR1 can be defined as Table 4, and maximum 4 states additionally defined on FR2 can be defined as Table 5.

TABLE 4

| $\bar{a}_{A+s}$ | SSB_ subcarrier_ offset | RMSI_ PDCCH_ config | Offset from reference GSCN | Raster size |
|---|---|---|---|---|
| 0 | 12 | 0~255 | 0 ~ 255 | 900 kHz |
| 0 | 13 | 0~255 | 256 ~ 511 | 900 kHz |
| 0 | 14 | 0~255 | −256 ~ −1 | 900 kHz |
| 1 | 12 | 0~255 | 0 ~ 255 | 1.44 MHz |
| 1 | 13 | 0~255 | 256 ~ 511 | 1.44 MHz |
| 1 | 14 | 0~255 | −256 ~ −1 | 1.44 MHz |

TABLE 5

| SSB_subcarrier_offset | RMSI_PDCCH_config | Offset from reference GSCN |
|---|---|---|
| 12 | 0~255 | 0~255 |
| 13 | 0~255 | 256~511 |
| 14 | 0~255 | −256~−1 |

If a frequency position of an RMSI existing SSB exists within an indicated indication range, a UE may discover an SSB by moving to an indicated position. Although a frequency position within an indication range is indicated, if the RMSI existing SSB does not exist at the indicated frequency position, the UE determines that the frequency position of the RMSI existing SSB does not exist within the current indication range and then discovers a frequency position of an RMSI existing SSB by performing a frequency again by starting with the indicated frequency position. Such a method can prevent the UE from performing an unnecessary frequency scan.

Besides, using 8 bits of a parameter (RMSI_PDCCH_config) for indicating a PRB grid offset, it is able to indicate an RMSI non-existing range to a UE by adding 'RMSI does not exist within a corresponding indication range' as follows.

Fifteenth state of PRB grid offset: RMSI does not exist within a corresponding indication range. The indication range is indicated through 8 bits of RMSI_PDCCH_config.

(8) Embodiment 8

A position currently accessed by a UE is set as a reference frequency position, and it is able to signal a frequency position of an RMSI existing SSB from the reference frequency position as a relative value. If 8 bits are used, it is possible to indicate total 256 relative SSB frequency positions. In this case, an indication range can be configured in a low or high frequency position direction from a current frequency position (i.e., a reference frequency position) [e.g., N=−127~+128] or in a single direction [e.g., N=0~255]. If an indication range is configured in a single direction, all UEs have the same frequency scan direction in case of an initial access, which can be defined in the standard document.

Moreover, if it is intended to inform a UE of a frequency position of an RMSI existing SSB within a frequency range greater than a frequency range that can be indicated using an 8-bit indicator, additional signaling for indicating such information is required. And, it is able to inform the UE of a frequency position of an RMSI existing SSB located within a frequency range greater than a frequency range corresponding to the cluster using spare states among the states that can be indicated using bits for PRB grid offset included in a PBCH content, i.e., a PBCH MIB.

For example, since 24 PRB grid offsets are indicated using 5 bits on a band FR1, maximum 8 states can be additionally defined. Since 12 PRB grid offsets are indicated using 4 bits on a band FR2, maximum 4 states can be additionally defined.

Moreover, as the bands n42, n7 and n38 in Table 3 share the same frequency band but have different sync raster sizes 1.44 MHz, 900 kHz and 900 kHz, respectively, they have different GSCN numbers on the same frequency band like Table 2. Hence, although a frequency position of an RMSI existing SSB is indicated, it is unclear that an indicated band indicates which band exactly in aspect of UE. This is because a band assumed by the UE as located there on may be different from an actually SSB detected band. Hence, to remove such ambiguity, it is necessary to signal whether a size of a sync raster is 900 kHz or 1.44 MHz.

Meanwhile, since the problem about the ambiguity may be caused on a band FR1, it is able to utilize 8 spare states that can be additionally defined on the band FR1.

Therefore, in Embodiment 8 like Embodiment 7, in order to indicate a frequency position of an RMSI existing SSB, maximum 8 states additionally defined on FR1 can be defined as Table 4, and maximum 4 states additionally defined on FR2 can be defined as Table 5.

If a frequency position of an RMSI existing SSB exists within an indicated indication range, a UE may discover an SSB by moving to an indicated position. Although a frequency position within an indication range is indicated, if the RMSI existing SSB does not exist at the indicated frequency position, the UE determines that the frequency position of the RMSI existing SSB does not exist within the current indication range and then discovers a frequency position of an RMSI existing SSB by performing a frequency again by starting with the indicated frequency position. Such a method can prevent the UE from performing an unnecessary frequency scan.

Besides, using 8 bits of a parameter (RMSI_PDCCH_config) for indicating a PRB grid offset, it is able to indicate an RMSI non-existing range to a UE by adding 'RMSI does not exist within a corresponding indication range' as follows.

Fifteenth state of PRB grid offset: RMSI does not exist within a corresponding indication range. The indication range is indicated through 8 bits of RMSI_PDCCH_config.

In the above-described Embodiments 1 to 8, among the states that can be indicated, 'RMSI does not exist within a corresponding band' or 'RMSI does not exist within a corresponding cluster' corresponding to a specific state is a state available in case that a specific service provider entirely operates a single band or cluster. If a service provider operates a prescribed portion of an NR band, since it is unable to know information on all frequency positions of SSB within the corresponding band, it is unable to indicate a state 'RMSI does not exist within a corresponding band' to a UE.

Therefore, as various service providers divide a specific band, when a portion of the specific band is operated by being assigned to each service provider, if RMSI does not exist on the partial band operated by a specific service provider, it may be able to instruct the UE to scan positions other than a frequency position of an SSB on the band operated by the specific service provider.

Namely, it is not mandatory for RMSI to exist at a frequency position of SSB indicated to the UE. If RMSI does not exist within a band portion operated by a service provider, the corresponding service provider may indicate a frequency position of SSB existing in a band portion operated by another service provided within the same NR band and enable a frequency position of an RMSI existing SSB to be discovered through a frequency scan from the corresponding frequency position.

<3. RMSI COREST Configuration of Minimum Bandwidth 10 MHz>

In an NR system, it is necessary to define a new configuration table for a minimum channel bandwidth of 10 MHz for an SSB having a subcarrier spacing of 15 kHz. Particularly, in case of a band n41 of Table 2, as a minimum channel bandwidth of 10 MHz used by an SSB having a subcarrier spacing of 15 kHz is used, it is necessary to consider a configuration for RMSI CORESET supportive of the band n41.

In order to reduce the number of SSBs for a wide minimum channel bandwidth such as 10 MHz, 40 MHz and the like, it is necessary to narrow down targets of all SSB candidates [down selection]. In case of a 15 kHz subcarrier spacing of a band n41, as a down selection value is 3, a sync raster value increases to 4.32 MHz. Hence, in case of supporting a sync raster of a big value for the subcarrier spacing of 15 kHz, an NR should consider a new configuration table for a 15 kHZ subcarrier spacing of an SSB having a minimum channel bandwidth of 10 MHz. Moreover, in making a CORESET configuration table, network operation flexibility should be considered according to a state of a network bandwidth. Hence, RMSI CORESET configuration for a 15 kHz subcarrier spacing and a minimum channel bandwidth of 10 MHz should be designed to support 10 MHz BW~20 MHz BW.

Meanwhile, although 4 bits for configuring RMSI CORESET are designated within MIB, the 4 bits are not enough to represent all candidates of an RB offset indicating a position of RMSI CORESET with reference to SSB. To solve such a problem, it is able to consider a method of defining two configuration tables according to an RMSI CORESET bandwidth and selecting a single table from RAN4. Yet, in case of the above-described method, there is a problem that a channel bandwidth and a bandwidth of RMSI CORESET can be limited. Hence, the above-described message my not be appropriate for network resource utilization.

Therefore, it is proposed to add an indication bit for a dynamic selection between two configuration tables to an MIB. To this end, it is able to utilize 1 bit among bits reserved for SSB index indication located within a PBCH content, i.e., the MIB. Namely, with total 5 bits resulting from adding 1 bit of a new MIB to 4 bits defined in advance, it is able to design a new configuration table for COREST configuration. Namely, for the CORESET configuration, an additional 1 bit is needed as well as 4 bits defined in advance. Such an additional 1 bit can utilize 1 bit among bits reserved for SSB index indication.

Figure 10:
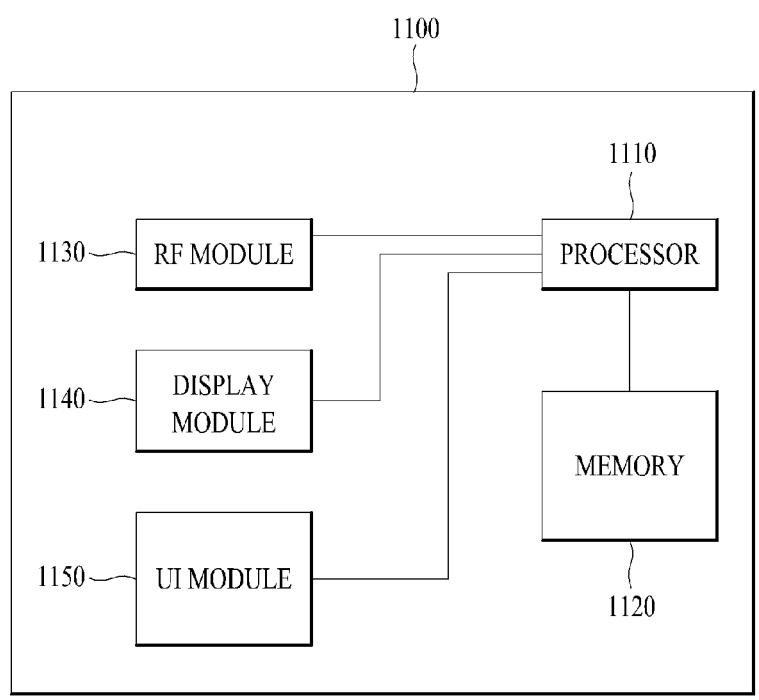
FIG. 10 is a block diagram of a communication apparatus according to an embodiment of the present disclosure.

Referring to FIG. 10, a communication apparatus 1100 includes a processor 1110, a memory 1120, an RF module 1130, a display module 1140, and a User Interface (UI) module 1150.

The communication device 1100 is shown as having the configuration illustrated in FIG. 11, for the convenience of description. Some modules may be added to or omitted from the communication apparatus 1100. In addition, a module of the communication apparatus 1100 may be divided into more modules. The processor 1110 is configured to perform operations according to the embodiments of the present disclosure described before with reference to the drawings. Specifically, for detailed operations of the processor 1110, the descriptions of FIGS. 1 to 9 may be referred to.

The memory 1120 is connected to the processor 1110 and stores an Operating System (OS), applications, program codes, data, etc. The RF module 1130, which is connected to the processor 1110, upconverts a baseband signal to an RF signal or downconverts an RF signal to a baseband signal. For this purpose, the RF module 1130 performs digital-to-analog conversion, amplification, filtering, and frequency upconversion or performs these processes reversely. The display module 1140 is connected to the processor 1110 and displays various types of information. The display module 1140 may be configured as, not limited to, a known component such as a Liquid Crystal Display (LCD), a Light Emitting Diode (LED) display, and an Organic Light Emitting Diode (OLED) display. The UI module 6050 is connected to the processor 1110 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Although the above-described method of receiving system information and apparatus therefor are described by focusing on an example of being applied to the 5G NewRAT system, they are applicable to various kinds of mobile communication systems as well as to the 5G NewRAT system.

What is claimed is:

1. A method of transmitting system information by a base station (BS) in wireless communication, the method comprising:
  generating first system information for a first Synchronization Signal Block (SSB); and
  transmitting the first SSB including a Physical Broadcasting Channel (PBCH) carrying the first system information,
  wherein generating the first system information for the first SSB comprises:
  generating the first system information for the first SSB such that the first system information for the first SSB includes i) information regarding absence of Remaining Minimum System Information (RSMI) related to the first SSB and ii) RMSI scheduling relevant information, wherein the RMSI scheduling relevant information relates to a specified frequency range where the BS provides no SSB associated with any RMSI.

2. The method according to claim 1, wherein the first SSB is transmitted at a first frequency position for a first synchronization raster, and
  wherein the specified frequency range includes the first synchronization raster.

3. The method according to claim 2, wherein a second SSB not associated with any RMSI is transmitted at a second frequency position that is not included in the first synchronization raster.

4. The method according to claim 1, wherein the specified frequency range is indicated based on the RMSI scheduling relevant information included in the PBCH.

5. A base station (BS) configured to transmit system information in wireless communication, the BS comprising:
at least one transmitter and at least one receiver;
at least one processor; and
at least one computer memory operably connectable to the at least one processor and storing instructions that, when executed, cause the at least one processor to perform operations comprising:
generating first system information a first Synchronization Signal Block (SSB); and
transmitting the first SSB including a Physical Broadcasting Channel (PBCH) carrying the first system information,
wherein generating the first system information for the first SSB comprises:
generating the first system information for the first SSB such that the first system information for the first SSB includes i) information regarding absence of Remaining Minimum System Information (RSMI) related to the first SSB and ii) RMSI scheduling relevant information, wherein the RMSI scheduling relevant information relates to a specified frequency range where the BS provides no SSB associated with any RMSI.

6. The BS according to claim 5, wherein the first SSB is transmitted at a first frequency position for a first synchronization raster, and
wherein the specified frequency range includes the first synchronization raster.

7. The BS according to claim 6, wherein a second SSB not associated with any RMSI is transmitted at a second frequency position that is not included in the first synchronization raster.

8. The BS according to claim 5, wherein the specified frequency range is indicated based on the RMSI scheduling relevant information included in the PBCH.

9. A method of receiving system information by a communication device in wireless communication, the method comprising:
detecting a first Synchronization Signal Block (SSB) including a Physical Broadcasting Channel (PBCH) carrying first system information; and
based on a determination that any Remaining Minimum System Information (RSMI) related to the first SSB is not present, determining that there is no SSB associated with any RMSI within a specified frequency range, based on RMSI scheduling relevant information included in the first system information, wherein the RMSI scheduling relevant information relates to the specified frequency range.

10. A communication device configured to receive system information in a wireless communication system, the communication device comprising:
at least one processor; and
at least one computer memory operably connectable to the at least one processor and storing instructions that, when executed, cause the at least one processor to perform operations comprising:
detecting a first Synchronization Signal Block (SSB) including a Physical Broadcasting Channel (PBCH) carrying first system information; and
based on a determination that any Remaining Minimum System Information (RSMI) related to the first SSB is not present, determining that there is no SSB associated with any RMSI within a specified frequency range, based on RMSI scheduling relevant information included in the first system information, wherein the RMSI scheduling relevant information relates to the specified frequency range.

11. The communication device according to claim 10, further comprising:
at least one transceiver.

* * * * *

UNITED STATES PATENT AND TRADEMARK OFFICE
CERTIFICATE OF CORRECTION

| | | |
|---|---|---|
| PATENT NO. | : 11,737,115 B2 | Page 1 of 1 |
| APPLICATION NO. | : 17/520367 | |
| DATED | : August 22, 2023 | |
| INVENTOR(S) | : Youngsub Kim et al. | |

It is certified that error appears in the above-identified patent and that said Letters Patent is hereby corrected as shown below:

In the Claims

Column 30, Line 54; In Claim 1, after "Minimum System Information" delete ""(RSMI)"" and insert -- "(RMSI)" -- therefor.

Column 31, Line 22; In Claim 5, after "Minimum System Information" delete ""(RSMI)"" and insert -- "(RMSI)" -- therefor.

Column 32, Line 8; In Claim 9, after "System Information" delete ""(RSMI)"" and insert -- "(RMSI)" -- therefor.

Column 32, Line 27; In Claim 10, after "System Information" delete ""(RSMI)"" and insert -- "(RMSI)" -- therefor.

Signed and Sealed this
Fourth Day of June, 2024

*Katherine Kelly Vidal*

Katherine Kelly Vidal
*Director of the United States Patent and Trademark Office*